US011785884B2

(12) United States Patent
Guo et al.

(10) Patent No.: US 11,785,884 B2
(45) Date of Patent: Oct. 17, 2023

(54) TRIMMER HEAD AND GRASS TRIMMER

(71) Applicant: Nanjing Chervon Industry Co., Ltd., Nanjing (CN)

(72) Inventors: Jianpeng Guo, Nanjing (CN); Sanglong Wang, Nanjing (CN); Longhai Chen, Nanjing (CN); Qi Zhang, Nanjing (CN); Hao Wang, Nanjing (CN); Toshinari Yamaoka, Nanjing (CN); Fangjie Nie, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 58 days.

(21) Appl. No.: 16/846,714

(22) Filed: Apr. 13, 2020

(65) Prior Publication Data
US 2020/0236848 A1 Jul. 30, 2020

Related U.S. Application Data

(63) Continuation of application No. PCT/CN2018/093762, filed on Jun. 29, 2018.

(30) Foreign Application Priority Data

Oct. 20, 2017 (CN) .......................... 201710985907.1
Dec. 27, 2017 (CN) .......................... 201711439441.1
Feb. 13, 2018 (CN) .......................... 201810149051.9

(51) Int. Cl.
*A01D 34/416* (2006.01)
(52) U.S. Cl.
CPC ..... *A01D 34/4162* (2013.01); *A01D 34/4163* (2013.01)

(58) Field of Classification Search
CPC ............ A01D 34/4161; A01D 34/4162; A01D 34/4163; A01D 34/90; A01D 34/412; A01D 34/416; A01D 34/4165; A01D 34/4166
See application file for complete search history.

(56) References Cited

U.S. PATENT DOCUMENTS 4,412,382 A * 11/1983 White, III .......... A01D 34/4163
30/276
8,266,805 B1 9/2012 Alliss
(Continued)

FOREIGN PATENT DOCUMENTS

CA 2887750 A1 11/2015
CN 105917839 A 9/2016
(Continued)

OTHER PUBLICATIONS

ISA/CN, International Search Report issued on application No. PCT/CN2018/093762, dated Sep. 4, 2018, 2 pages.
(Continued)

*Primary Examiner* — Evan H Macfarlane
(74) *Attorney, Agent, or Firm* — Greenberg Traurig, LLP

(57) ABSTRACT

A trimmer head includes a spool formed with a winding portion for winding a trimmer line and a head housing formed with an accommodating space for accommodating at least a portion of the spool. The trimmer head further includes an intermediate element for transmitting a torque between the spool and the head housing such that one of the spool and the head housing rotates with the other. The spool drives the intermediate element to rotate and the intermediate element is slidably connected to the spool in a direction along a rotation axis or parallel to the rotation axis. The spool does not move in the axial direction when the trimmer head of the grass trimmer is unwinding the trimmer line, (Continued)

thereby effectively avoiding the problem of the trimmer line jamming.

10 Claims, 28 Drawing Sheets

(56) References Cited

U.S. PATENT DOCUMENTS

| | | | |
|---|---|---|---|
| 2005/0217120 | A1 | 10/2005 | Proulx |
| 2008/0282552 | A1 | 11/2008 | Arnetoli |
| 2011/0225832 | A1 | 9/2011 | Alliss |
| 2011/0302791 | A1 | 12/2011 | Proulx |
| 2016/0183452 | A1* | 6/2016 | Kullberg ............... A01D 34/90 30/276 |
| 2018/0271012 | A1* | 9/2018 | Guo et al. ............ A01D 34/006 |
| 2018/0279547 | A1* | 10/2018 | Sergyeyenko et al. ...................... A01D 34/4163 |
| 2020/0008348 | A1* | 1/2020 | Guo et al. .......... A01D 34/4166 |
| 2021/0400867 | A1* | 12/2021 | Peng et al. ......... A01D 34/4166 |

FOREIGN PATENT DOCUMENTS

| | | |
|---|---|---|
| CN | 105934147 A | 9/2016 |
| CN | 106993425 A | 8/2017 |
| CN | 106993426 A | 8/2017 |
| CN | 106993429 A | 8/2017 |
| DE | 3922339 C1 | 10/1990 |
| WO | 2008/026151 A2 | 3/2008 |
| WO | 2015/077393 A1 | 5/2015 |
| WO | 2016/173657 A1 | 11/2016 |

OTHER PUBLICATIONS

EPO, extended European search report issued on European patent application No. 18869448.3, dated Oct. 15, 2020, 10 pages.
Australian Patent Office, Examination Report issued on Australian patent application No. 2018353174, dated Feb. 8, 2021, 4 pages.

* cited by examiner

TRIMMER HEAD AND GRASS TRIMMER

RELATED APPLICATION INFORMATION

This application claims the benefit of and is a continuation of International Application Number PCT/CN2018/093762, filed on Jun. 29, 2018, through which this application also claims the benefit under 35 U.S.C. § 119(a) of Chinese Patent Application No. CN 201710985907.1, filed on Oct. 20, 2017, Chinese Patent Application No. CN 201711439441.1, filed on Dec. 27, 2017, and Chinese Patent Application No. CN 201810149051.9, filed on Feb. 13, 2018, each of which is incorporated by reference in its entirety herein.

TECHNICAL FIELD

The present disclosure relates to a garden-type tool, in particular to a trimmer head and a grass trimmer.

BACKGROUND

As a lawn trimming tool in garden-type tools, a grass trimmer has attracted widespread attention. Usually, the grass trimmer includes a trimmer head for trimming grass, the trimmer head is provided with a spool for winding a trimmer line. At present, in order to wind the trimmer line to the spool, a user usually needs to remove the spool and manually wind the trimmer line. Obviously, such operation is time-consuming and labor-consuming, and reduces the work efficiency. For this reason, there is also a trimmer head on the market that can wind the trimmer line to a spool without disassembling the spool. However, the user still needs to manually rotate a part of the trimmer head to drive the spool to rotate so as to wind the trimmer line to the spool, and the user will still feel tired in the long run.

In the prior grass trimmer, when the manual winding is required, the user usually needs to hold a head housing with one hand and the operating element with the other hand, so that the user needs to operate with both hands at the same time, so that the trimmer line is wound onto an arm, thereby causing the winding process to be interrupted. Moreover, when winding, the spool moves up and down in the axial direction, thereby easily causing a problem of unilateral winding of the trimmer line.

Furthermore, a size of the operating element for the user's operation in the trimmer head is also generally small, and the operating element is easy to cause severe wear with the ground, thereby reducing the life of the grass trimmer.

In addition, in order to align outer holes and inner holes of the trimmer head, the user also needs to adjust the alignment of the inner holes and outer holes before threading, thereby reducing the work efficiency.

Moreover, existing grass trimmers are heavier in weight and larger in size.

SUMMARY

In one disclosed example, a trimmer head includes a spool formed with a winding portion for winding a trimmer line; a head housing formed with an accommodating space for accommodating at least a portion of the spool; wherein the trimmer head further includes an intermediate element for transmitting a torque between the spool and the head housing such that one of the spool and the head housing rotates with the other, the spool drives the intermediate element to rotate, and the intermediate element is slidably connected to the spool in a direction along a rotation axis or parallel to the rotation axis.

In a further example, the intermediate element rotates synchronously with the spool, and the intermediate element has at least a driving position and a non-driving position when sliding relative to the spool along the rotation axis; when the intermediate element is in the driving position, the intermediate element at least drives the head housing to rotate with the spool in a rotation direction about the rotation axis; and when the intermediate element is in the non-driving position, the intermediate element stops driving the head housing.

In a further example, the trimmer head includes an operating element fixedly connected or integrally formed with the intermediate element, and the operating element includes an operating portion at least partially protruding out of the accommodating space for a user to operate.

In a further example, the intermediate element is formed with driving teeth arranged sequentially in a circumferential direction around the rotation axis, a number of the driving teeth are at least two, and the head housing is formed with matching teeth for matching the driving teeth.

In a further example, the head housing is formed with a bottom surface at least partially extending in a plane perpendicular to the rotation axis, the matching teeth are located on a side of the bottom surface, and the bottom surface is also formed with limiting teeth for limiting an angle at which the spool rotates with respect to the head housing in the rotation direction about the rotation axis, and the limiting teeth are formed on the other side of the bottom surface.

In a further example, the intermediate element includes an annular portion surrounding the rotation axis, and the driving teeth extend from the annular portion in a radial direction away from the rotation axis.

In a further example, each of the matching teeth are formed with a driving surface for receiving a driving force of the driving teeth so that the head housing rotates synchronously with the spool in the rotation direction and an inclined surface allowing the spool to rotate with respect to the head housing in the other rotation direction about the rotation axis.

In a further example, the intermediate element and the operating element are two independently formed parts, the intermediate element and the operating element are fixedly connected by fasteners, the head housing is formed with a bottom surface at least partially extending in a plane perpendicular to the rotation axis, the driving teeth are located on one side of the bottom surface close to the spool, and the operating portion is located on the other side of the bottom surface.

In a further example, the head housing is formed or fixedly connected with a first airflow member for generating an airflow away from the trimmer head when the first airflow member rotates with the trimmer head.

In a further example, the trimmer head includes an anti-winding cover including a contact portion in contact with the first airflow member, and the anti-winding cover rotates synchronously with the first airflow member.

In a further example, the trimmer head is capable of being adapted to a grass trimmer having an auto-winding mode and including a motor; when the trimmer head is connected to the motor and the grass trimmer is in the auto-winding mode, the spool or the head housing can be driven by the motor to rotate in a first rotation direction, and the trimmer line is automatically wound to the spool; wherein the trimmer head further includes an operating element for a user to operate; and when the trimmer head is connected to the motor and the grass trimmer is not in the auto-winding mode, the operating element is operable to drive the spool or the head housing to rotate, the spool rotates with respect to the head housing in the first rotation direction about the rotation axis, and the trimmer line is wound to the spool.

In a further example, the trimmer head includes a limiting device for limiting the rotation of the head housing.

In a further example, the limiting device is a one-way bearing.

In a further example, the operating element rotates synchronously with the spool and the operating element is formed with or connected with driving portions for driving the head housing to rotate.

In a further example, the operating element is slidably connected with the spool in the direction along the rotation axis, and the operating element has at least a first position and a second position when sliding relative to the spool; when the operating element is in the first position, the spool and the head housing constitute synchronous rotation in a second rotation direction; and when the operating element is in the second position, the spool and the head housing form a rotational connection so that the spool can rotate relative to the head housing in the first rotation direction.

In a further example, the head housing is formed with or connected with matching portions for matching with the driving portions, each of the matching portions is formed with a driving surface for receiving a driving force of the driving portions so that the head housing rotates synchronously with the spool in a second rotation direction about the rotation axis and an inclined surface allowing the spool to rotate with respect to the head housing in the first rotation direction about the rotation axis, and the inclined surface forms a sliding fit with the driving portions.

In a further example, the operating element rotates synchronously with the spool, the operating element is formed with a surrounding portion surrounding the rotation axis, the spool is formed with a connecting portion inserted into the surrounding portion or sheathed outside the surrounding portion, the winding portion surrounds the rotation axis, and the surrounding portion at least partially extends into the winding portion in the direction along the rotation axis.

In a further example, the operating element rotates synchronously with the spool, the operating element is slidably connected with the spool in the direction along the rotation axis, the trimmer head further includes a biasing element disposed between the operating element and the spool, the biasing element generates a biasing force that moves the operating element in a direction away from the spool.

In a further example, the head housing includes a first housing portion formed with outer holes for threading and a second housing portion connected to the first housing portion, the first housing portion and the second housing portion surround to form the accommodating space when the first housing portion and the second housing portion are connected, and the operating element at least partially protrudes outside the accommodating space.

In a further example, the head housing is formed with outer holes for the trimmer line to pass through the head housing, the spool is formed with inner holes for the trimmer line to insert the spool or pass through the spool, the trimmer head has a winding mode capable of winding the trimmer line to the spool, when the trimmer line passes through the outer holes from the outside of the trimmer head and then inserts or passes through the inner holes; and when the trimmer line is in the winding mode, the spool generates a relative rotation with respect to the head housing about the rotation axis, and the position of the inner holes in a direction parallel to the rotation axis remains unchanged relative to the position of the outer holes in the direction parallel to the rotation axis.

In a further example, the position of the spool relative to the head housing in the direction along the rotation axis is substantially constant when the trimmer line is in the winding mode.

In a further example, the trimmer head further includes an operating element including an operating portion for a user to operate; a contact member formed with a contact surface for contacting a ground when the trimmer head is mowing grass; wherein the spool is formed with inner holes for the trimmer line to insert the spool or pass through the spool, the head housing is formed with outer holes for the trimmer line to pass through the head housing, the operating element drives the spool to rotate, the operating element is rotatably connected to the head housing with the rotation axis as an axis, and the contact member is rotatably connected to the operating element with the rotation axis as an axis.

In a further example, the trimmer head includes a connecting member rotatably connecting the contact member and the operating element.

In a further example, the connecting member is a one-way bearing.

In a further example, the operating element is slidably connected with the spool in the direction along the rotation axis, a portion of the operating portion located outside the accommodating space for the user to operate has a projection in a plane perpendicular to the rotation axis, the area of the projection is greater than or equal to 50 square millimeters and less than or equal to 80 square millimeters.

In a further example, the head housing is formed with outer holes for the trimmer line to pass through the head housing, the spool is formed with inner holes for the trimmer line to insert the spool or pass through the spool, and the trimmer head further includes an operating element for a user to operate; when the operating element rotates with respect to the head housing in a first rotation direction about the rotation axis, the trimmer line is wound to the winding portion; and wherein a whole of the spool and the operating element is further formed or connected with driving portions, the head housing is formed with matching portions for matching the driving portions, each of the matching portions is formed with a driving surface for receiving a driving force of the driving portions so that the head housing rotates synchronously with the spool in a first rotation direction about the rotation axis and an inclined surface allowing the spool to rotate with respect to the head housing in the second rotation direction about the rotation axis, the inclined surface forms a sliding fit with the driving portions, the inclined surface obliquely intersects with a plane perpendicular to the rotation axis to form an angle, and the angle is greater than or equal to 12 degrees and less than or equal to 45 degree.

In a further example, the trimmer head includes a biasing element for biasing the spool or the operating element toward a position where the matching portions moves along the inclined surface to match with the driving surface, the inner holes and the outer holes are aligned when the matching portions are matching with the driving surface, a height of the driving surface in a direction parallel to the rotation axis is smaller than a height of the inclined surface in the direction parallel to the rotation axis, each of the driving portions further include a connecting surface disposed between the driving surface and the inclined surface, the connecting surface connects with the driving surface and the inclined surface respectively, and a plane in which the connecting surface is located obliquely intersects with the rotation axis.

In a further example, the spool is formed with inner holes for inserting or passing the trimmer line, the head housing includes a first housing portion and a second housing portion, and the first housing portion and the second housing portion are detachably connected; when the first housing portion and the second housing portion are connected, the first housing portion and the second housing portion collectively surround to form the accommodating space for accommodating the spool; and wherein the trimmer head further includes an operating element connected to the second housing portion, the operating element includes an operating portion at least partially protruding out of the accommodating space for a user to operate, the operating element is further formed with guiding portions, the guiding portions guide the spool to rotate about the rotation axis to a insertion position in which the inner holes and the outer holes are at least partially aligned when the user integrally mounts the operating element and the second housing portion to the first housing portion.

In a further example, the spool is formed with protrusions for cooperating with the guiding portions and guided by the guiding portion, the guide portions are formed with driving grooves for cooperating with the protrusions to drive the operating element to rotate synchronously with the spool and guiding grooves for guiding the protrusions to move to the driving grooves.

In a further example, the driving grooves extend in a direction parallel to the rotation axis, the guiding grooves are formed at one end of the driving grooves, and the guiding grooves are trumpet-shaped.

In a further example, the driving grooves extend in a direction parallel to the rotation axis, the guiding grooves are formed at one end of the driving grooves, and the guiding grooves include guiding groove walls extending in a plane inclined to intersect with the rotation axis.

In a further example, a grass trimmer includes a trimmer head for trimming grass; a driving device capable of driving the trimmer head to rotate around a rotation axis to realize a mowing function; wherein the trimmer head includes a spool formed with a winding portion for winding a trimmer line; a head housing formed with an accommodating space for accommodating at least a portion of the spool; wherein when the trimmer head is installed to the grass trimmer, the spool or the head housing is connected with the driving device to introduce power output from the driving device into the trimmer head; and wherein the trimmer head further includes an intermediate element for transmitting a torque between the spool and the head housing such that one of the spool and the head housing rotates with the other, the spool drives the intermediate element to rotate, and the intermediate element is slidably connected to the spool in a direction along the rotation axis or parallel to the rotation axis.

In a further example, the intermediate element rotates synchronously with the spool, and the intermediate element has at least a driving position and a non-driving position when sliding relative to the spool along the rotation; when the intermediate element is in the driving position, the intermediate element drives the head housing to rotate with the spool in a rotation direction about the rotation axis; and when the intermediate element is in the non-driving position, the intermediate element stops driving the head housing.

In a further example, the trimmer head includes an operating element fixedly connected or integrally formed with the intermediate element, the operating element includes an operating portion at least partially protrudes out of the accommodating space for a user to operate.

In a further example, the intermediate element is formed with driving teeth arranged sequentially in a circumferential direction around the rotation axis, a number of the driving teeth are at least two, and the head housing is formed with matching teeth for matching the driving teeth.

In a further example, the head housing is formed with a bottom surface extending at least partially in a plane perpendicular to the rotation axis, the matching teeth are located on a side of the bottom surface, and the bottom surface is also formed with limiting teeth for limiting an angle at which the spool rotates with respect to the head housing in the rotation direction about the rotation axis, and the limiting teeth are formed on the other side of the bottom surface.

In a further example, the intermediate element includes an annular portion surrounding around the rotation axis, and the driving teeth extend from the annular portion in a radial direction away from the rotation axis.

In a further example, each of the matching teeth are formed with a driving surface for receiving a driving force of the driving teeth so that the head housing rotates synchronously with the spool in the rotation direction and an inclined surface allowing the spool to rotate with respect to the head housing in the other rotation direction about the rotation axis.

In a further example, the intermediate element and the operating element are two independently formed parts, the intermediate element and the operating element are fixedly connected by fasteners the head housing is formed with a bottom surface at least partially extending in a plane perpendicular to the rotation axis, the driving teeth are located on one side of the bottom surface close to the spool, and the operating portion is located on the other side of the bottom surface.

In a further example, the head housing is formed or fixedly connected with a first airflow member for generating an airflow away from the trimmer head when the first airflow member rotates with the trimmer head.

In a further example, the trimmer head includes an anti-winding cover including a contact portion in contact with the first airflow member, and the anti-winding cover rotates synchronously with the first airflow member.

In a further example, the driving device includes a motor for outputting a driving force, and the trimmer head has an auto-winding mode; when the trimmer head is in the auto-winding mode, the motor drives the spool or the head housing, the spool rotates with respect to the head housing in a first rotation direction, and the trimmer line is automatically wound to the spool; wherein the trimmer head further includes an operating element for a user to operate, and the trimmer head has a manual winding mode; and when the trimmer head is in the manual winding mode, the user operates the operating element, the operating element drives the spool or the head housing to rotate, the spool rotates with respect to the head housing in the first rotation direction about the rotation axis, and the trimmer line is wound to the spool.

In a further example, the trimmer head includes a limiting device for limiting the rotation of the head housing when the trimmer head is in the auto-winding mode or the manual winding mode.

In a further example, the limiting device is a one-way bearing.

In a further example, the operating element rotates synchronously with the spool and the operating element is formed with or connected with driving portions for driving the head housing to rotate.

In a further example, the operating element is slidably connected with the spool in the direction along the rotation axis, and the operating element has at least a first position and a second position when sliding relative to the spool; when the operating element is in the first position, the spool and the head housing constitute synchronous rotation in a second rotation direction; and when the operating element is in the second position, the spool and the head housing form a rotational connection so that the spool can rotate relative to the head housing in the first rotation direction.

In a further example, the head housing is formed with or connected with matching portions for matching with the driving portions, each of the matching portions is formed with a driving surface for receiving a driving force of the driving portions so that the head housing rotates synchronously with the spool in a second rotation direction about the rotation axis and an inclined surface allowing the spool to rotate with respect to the head housing in the first rotation direction about the rotation axis, and the inclined surface forms a sliding fit with the driving portions.

In a further example, the operating element rotates synchronously with the spool, the operating element is formed with a surrounding portion surrounding the rotation axis, the spool is formed with a connecting portion inserted into the surrounding portion or sheathed outside the surrounding portion, the winding portion surrounds the rotation axis, and the surrounding portion at least partially extends into the winding portion in the direction along the rotation axis.

In a further example, the operating element rotates synchronously with the spool, the operating element is slidably connected with the spool in the direction along the rotation axis, the trimmer head further comprises a biasing element disposed between the operating element and the spool and generating a biasing force that moves the operating element in a direction away from the spool.

In a further example, the head housing includes a first housing portion formed with outer holes for threading and a second housing portion connected to the first housing portion, the first housing portion and the second housing portion surround to form the accommodating space when the first housing portion and the second housing portion are connected, and the operating element at least partially protrudes outside the accommodating space.

In a further example, the driving device includes a motor including a motor shaft for outputting power, a first housing used to accommodate the motor and a second airflow member at least partially disposed in the first housing.

In a further example, the head housing is further formed with outer holes for the trimmer line to pass through the head housing, the spool is formed with inner holes for the trimmer line to insert the spool or pass through the spool, a motor shaft is fixedly connected with the spool or the head housing, the trimmer head has a winding mode capable of winding the trimmer line to the spool, when trimmer line passes through the outer holes from the outside of the trimmer head and then inserts or passes through the inner holes; and when the trimmer line is in the winding mode, the spool generates a relative rotation with respect to the head housing about the rotation axis, and the position of the inner holes in a direction parallel to the rotation axis remains unchanged relative to the position of the outer holes in the direction parallel to the rotation axis.

In a further example, the position of the spool relative to the head housing in the direction along the rotation axis is substantially constant when the trimmer line is in the winding mode.

In a further example, the trimmer head includes an operating element including an operating portion for a user to operate; a contact member formed with a contact surface for contacting a ground when the trimmer head is mowing grass; wherein the spool is formed with inner holes for the trimmer line to insert the spool or pass through the spool, the head housing is formed with outer holes for the trimmer line to pass through the head housing, the operating element drives the spool to rotate, the operating element is rotatably connected to the head housing with the rotation axis as an axis, the contact member is rotatably connected to the operating element with the rotation axis as an axis.

In a further example, the trimmer head includes a connecting member rotatably connecting the contact member and the operating element.

In a further example, the connecting member is a one-way bearing.

In a further example, the operating element is slidably connected with the spool in the direction along the rotation axis, a portion of the operating portion located outside the accommodating space for the user to operate has a projection in a plane perpendicular to the rotation axis, the area of the projection is greater than or equal to 50 square millimeters and less than or equal to 80 square millimeters.

In a further example, the head housing is formed with outer holes for the trimmer line to pass through the head housing, the spool is formed with inner holes for the trimmer line to insert the spool or pass through the spool, the trimmer head further includes an operating element for a user to operate; when the operating element rotates with respect to the head housing in a first rotation direction about the rotation axis, the trimmer line is wound to the winding portion; and wherein a whole of the spool and the operating element is further formed or connected with driving portions, the head housing is formed with matching portions for matching the driving portions, each of the matching portions is formed with a driving surface for receiving a driving force of the driving portions so that the head housing rotates synchronously with the spool in a first rotation direction about the rotation axis and an inclined surface allowing the spool to rotate with respect to the head housing in the second rotation direction about the rotation axis, and the inclined surface forms a sliding fit with the driving portions, the inclined surface obliquely intersects with a plane perpendicular to the rotation axis to form an angle, and the angle is greater than or equal to 12 degrees and less than or equal to 45 degree. In a further example, the trimmer head includes a biasing element for biasing the spool or the operating element toward a position where the matching portions moves along the inclined surface to match with the driving surface, the inner holes and the outer holes are aligned when the matching portions are matching with the driving surface, a height of the driving surface in a direction parallel to the rotation axis is smaller than a height of the inclined surface in the direction parallel to the rotation axis, each of the driving portions further include a connecting surface disposed between the driving surface and the inclined surface, the connecting surface connects with the driving surface and the inclined surface respectively, and a plane in which the connecting surface is located obliquely intersects with the rotation axis.

In a further example, the spool is formed with inner holes for inserting or passing the trimmer line, the head housing includes a first housing portion and a second housing portion, and the first housing portion and the second housing portion are detachably connected; when the first housing portion and the second housing portion are connected, the first housing portion and the second housing portion collectively surround to form the accommodating space for accommodating the spool; and wherein the trimmer head further includes an operating element connected to the second housing portion, the operating element includes an operating portion at least partially protruding out of the accommodating space for a user to operate, the operating element is further formed with guiding portions, the guiding portions guide the spool to rotate about the rotation axis to a insertion position in which the inner holes and the outer holes are at least partially aligned when the user integrally mounts the operating element and the second housing portion to the first housing portion.

In a further example, the spool is formed with protrusions for cooperating with the guiding portions and guided by the guiding portion, the guide portions are formed with driving grooves for cooperates with the protrusions to drive the operating element to rotate synchronously with the spool and guiding grooves for guiding the protrusions to move to the driving grooves.

In a further example, the driving grooves extend in a direction parallel to the rotation axis, the guiding grooves are formed at one end of the driving grooves, and the guiding grooves are trumpet-shaped.

In a further example, the driving grooves extend in a direction parallel to the rotation axis, the guiding grooves are formed at one end of the driving grooves, and the guiding grooves include guiding groove walls extending in a plane inclined to intersect with the rotation axis.

In a further example, the driving device includes an electric motor for driving the trimmer head to rotate, the electric motor includes a rotor assembly including a rotor shaft and a rotor sleeve surrounding the rotor shaft and a stator assembly at least partially accommodated within the rotor sleeve, the electric motor is a brushless electric motor, the diameter of the rotor sleeve is D mm, and the diameter of the rotor sleeve is greater than or equal to 15 and less than or equal to 48.

In a further example, the diameter of the rotor sleeve is greater than or equal to 30 and less than or equal to 40.

In a further example, the diameter of the rotor sleeve is 35.

The present disclosure provides an advantage in that the spool does not move in the axial direction when the trimmer head of the grass trimmer is unwinding the trimmer line, thereby effectively avoiding the problem of the trimmer line jamming.

DETAILED DESCRIPTION

Figure 1:
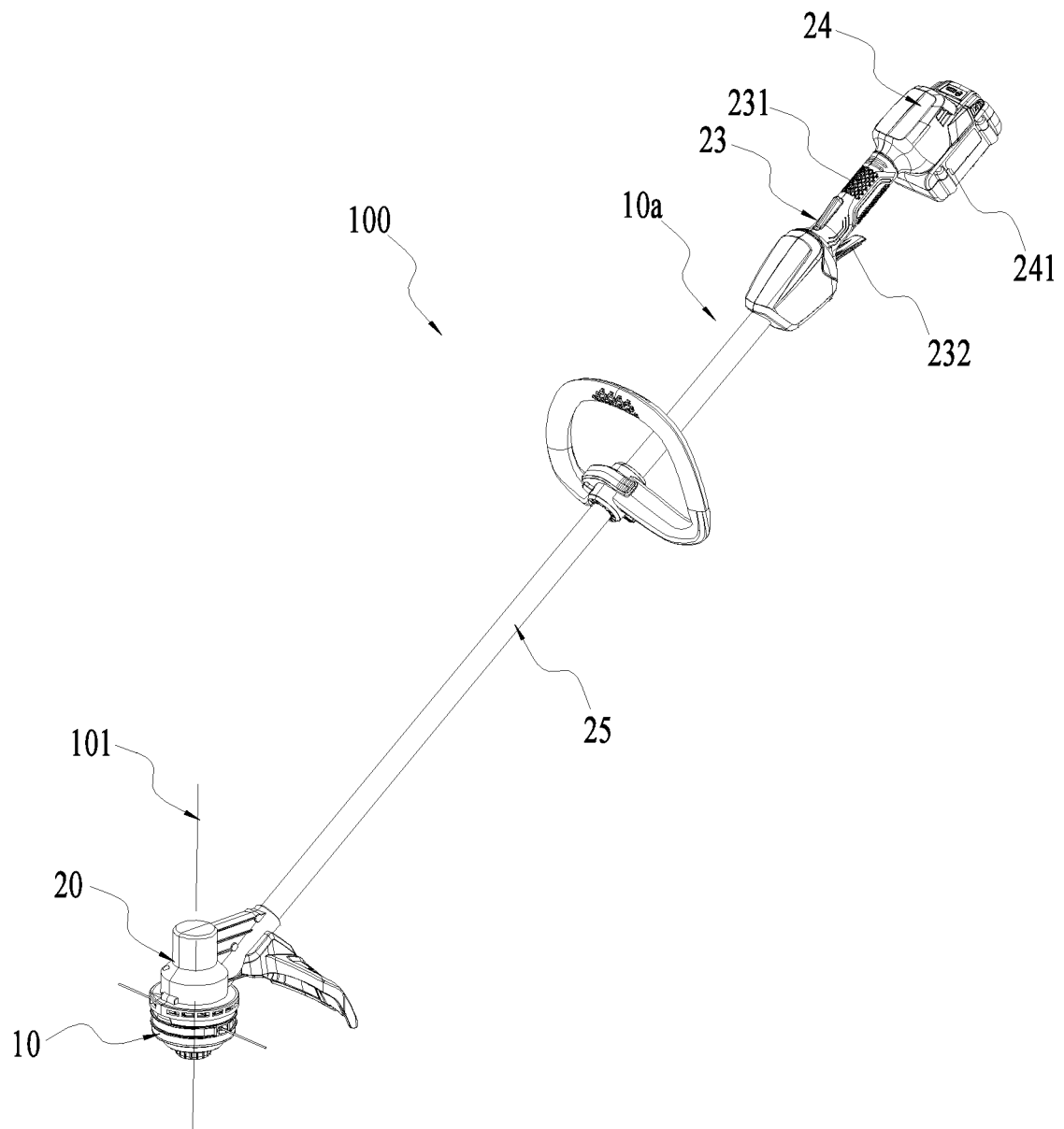
FIG. 1 is a three-dimensional view of a grass trimmer according to a first example of the present invention.
Figure 2:
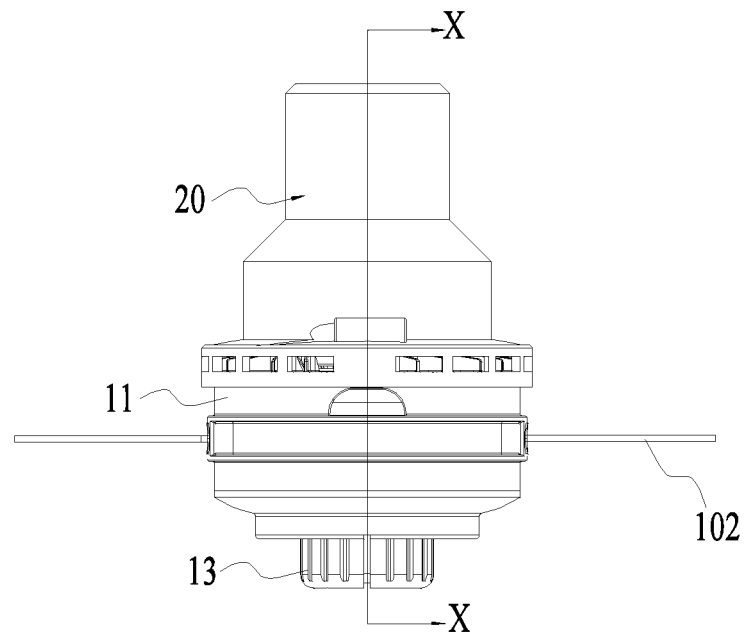
FIG. 2 is a plan view of a driving device and a trimmer head in FIG. 1.
Figure 3:
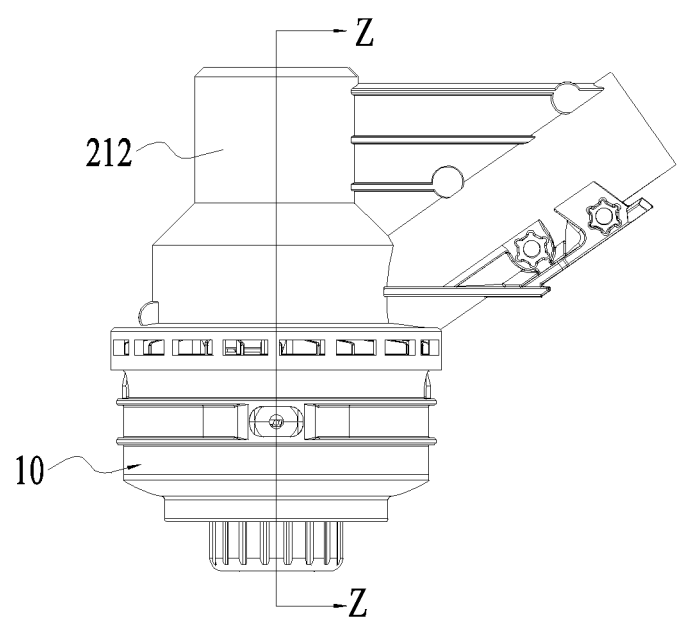
FIG. 3 is a right view of the structure in FIG. 2.
Figure 4:
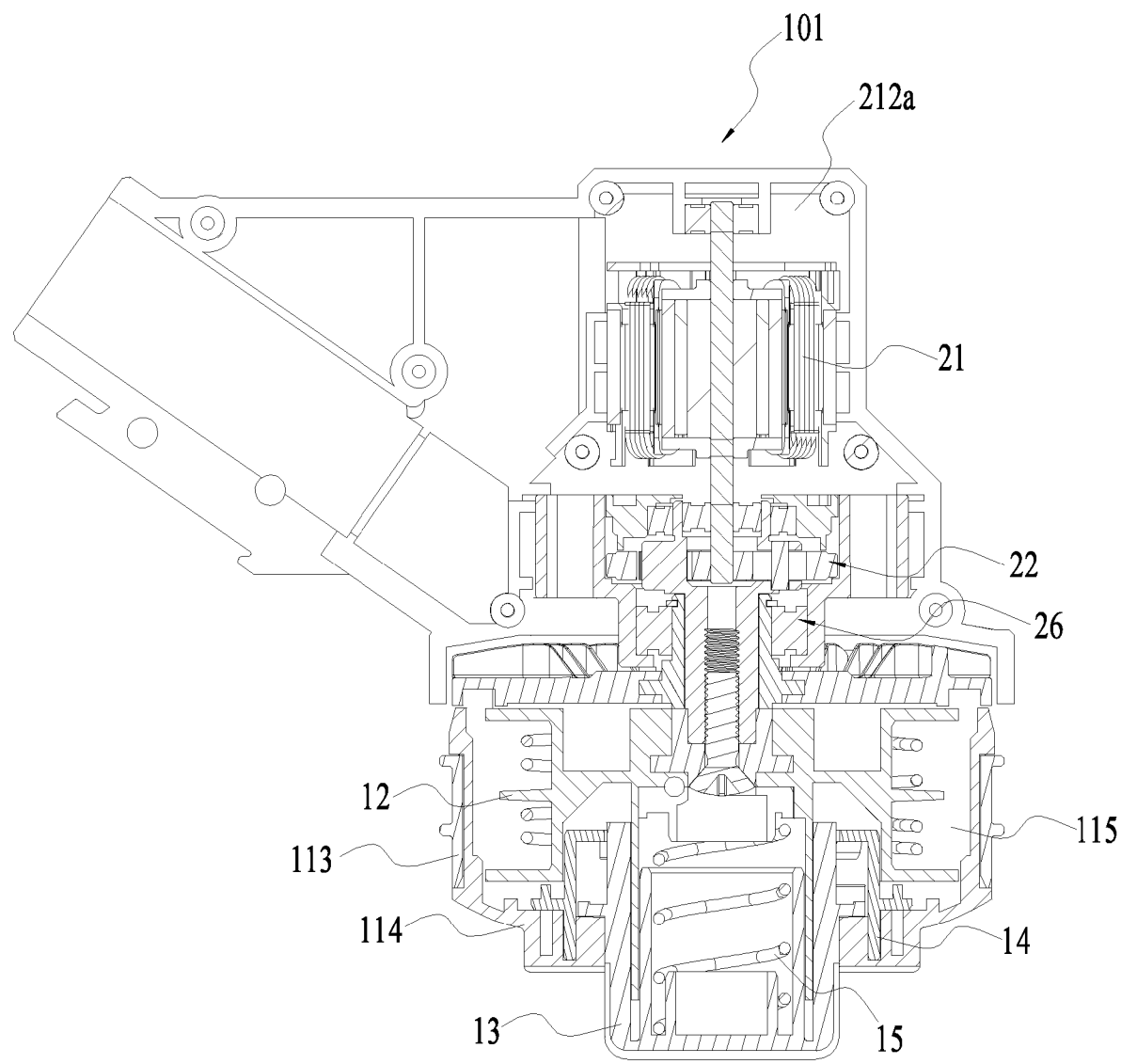
FIG. 4 is a sectional view of the structure in FIG. 2 taken along the line X-X.

A grass trimmer 100, which is equipped with a trimmer head 10, shown in FIG. 1 is used as a lawn trimming tool for a user to trim grass or mow vegetation or trim a lawn. As shown in FIG. 1, the grass trimmer 100 includes the trimmer head 10 and a trimming main body 10*a*. The trimming main body 10*a* includes a driving device 20, an operating device 23, a power supply device 24 and a connecting device 25. The operating device 23 may include a handle 231 for the user to hold, and further include a main switch 232 for activating the grass trimmer 100 to trim grass. The power supply device 24 may include a battery park 241 for supplying power.

The trimmer head 10 is used for trimming grass, the driving device 20 is used for driving the trimmer head 10 to rotate around a rotation axis 101, the operating device 23 is used for the user to operate to control the grass trimmer 100, the power supply device 24 is used for supply power source to the driving device 20, the connecting device 25 is used for connecting the driving device 20, the operating device 23 and the power supply device 24 so as to make them form a whole which can move together.

As shown in FIG. 1 to FIG. 5, the driving device 20 includes a motor 21, a first housing 212 and a transmission assembly 22. The motor 21 is used to drive the trimmer head 10 to rotate. The motor 21 may include a motor shaft 211. In the present example, the motor 21 also rotates about the rotation axis 101. Understandably, in other examples, the motor shaft 211 may also not rotate with the rotation axis 101 as an axis. For example, the motor shaft 211 may rotate about a line parallel to the rotation axis 101, and the motor shaft 211 may also rotate about a line perpendicular to the rotation axis 101. The first housing 212 is used to accommodate the motor 21, and the first housing 212 is also fixedly connected with the connecting device 25 so that the driving device 20 is connected to the connecting device 25. The first housing 212 may be formed with a receiving cavity 212a, and the motor 21 is disposed in the receiving cavity 212a. The transmission assembly 22 is used to transfer power between the motor 21 and the trimmer head 10.

The trimmer head 10 is used to drive a trimmer line 102 to rotate at a high speed to cut vegetation. The trimmer head 10 includes a head housing 11, a spool 12 and an operating element 13. The head housing 11 is used to accommodate the spool 12. The spool 12 is disposed in an accommodating space 115 surrounded by the head housing 11. The spool 12 also includes winding portions 124 for winding the trimmer line 102. In the present example, a number of the winding portions 124 is two, and the two winding portions 124 are separated by a flange portion 126. The operating element 13 is connected to the spool 12 and at least partially extends to the outside of the head housing 11 for a user to operate. The grass trimmer 100 has an auto-winding mode, a manual winding mode and a cutting mode. Of course, it can also be considered that the trimmer head 10 has the auto-winding mode, the manual winding mode and the cutting mode. When the trimmer head 10 is in the auto-winding mode, the motor 21 can drive the spool 12 to rotate in a first rotation direction with respect to the head housing 11 about the rotation axis 101 so as to automatically wind the trimmer line 102 to the spool 12. When the trimmer head 10 is in the manual winding mode, the user may rotate the operating element 13 so that the spool 12 rotates in the first rotation direction with respect to the head housing 11 about the rotation axis 101, and the trimmer line 102 can be wound to the spool 12. When the user actives the motor 21 by operating the main switch 232, the motor 21 can drive the spool 12 to rotate in a second rotation direction about the rotation axis 101 so that the grass trimmer 100 is in the cutting mode. In the present example, when the user looks from the motor 21 toward the trimmer head 10, the first rotation direction can be regarded as a counterclockwise direction and the second rotation direction can be regarded as a clockwise direction correspondingly, which is not limited thereto.

Understandably, in other examples, the motor shaft 211 can also be connected to the head housing 11 to drive the head housing 11 to rotate. Thus, when the trimmer head 10 is in the auto-winding mode, the motor 21 drives the head housing 11 to rotate so that a relative rotation of the spool 12 relative to the head housing 11 occurs in the first rotation direction, thus the trimmer line 102 can be automatically wound to the spool 12. Similarly, the operating element 13 may be connected to the head housing 11. When the trimmer head 10 is in the manual winding mode, the user operates the operating element 13 to drive the head housing 11 to rotate so that a relative rotation of the spool 12 relative to the head housing 11 occurs in the first rotation direction, thus the trimmer line 102 can be wound to the spool 12.

Thus, the trimmer head 10 can transfer the power from the motor 21 to the spool 12 to automatically wind the trimmer line 102, and the trimmer head 10 can also transfer the power from the operating element 13 to the spool 12 to automatically wind the trimmer line 102. Therefore, the user can either automatically wind the trimmer line 102 by triggering the operating device 23 or manually wind the trimmer line 102 by rotating the operating element 13, so that the manual, automatic integrated grass trimmer 100 can be truly realized. Thus, on one hand, when the user winds the trimmer line 102 by rotating the operating element 13, the user may feel fatigue. At this time, the user can automatically wind the trimmer line 102 to the spool by operating the operating device 23. Thus, it is convenient for the user's operation and improves the efficiency of the work. In addition, when the auto-winding mode of the grass trimmer 100 fails, the user can also manually wind the trimmer line 102 to the spool 12 by rotating the operating element 13, thereby improving the reliability of the grass trimmer 100.

Figure 5:
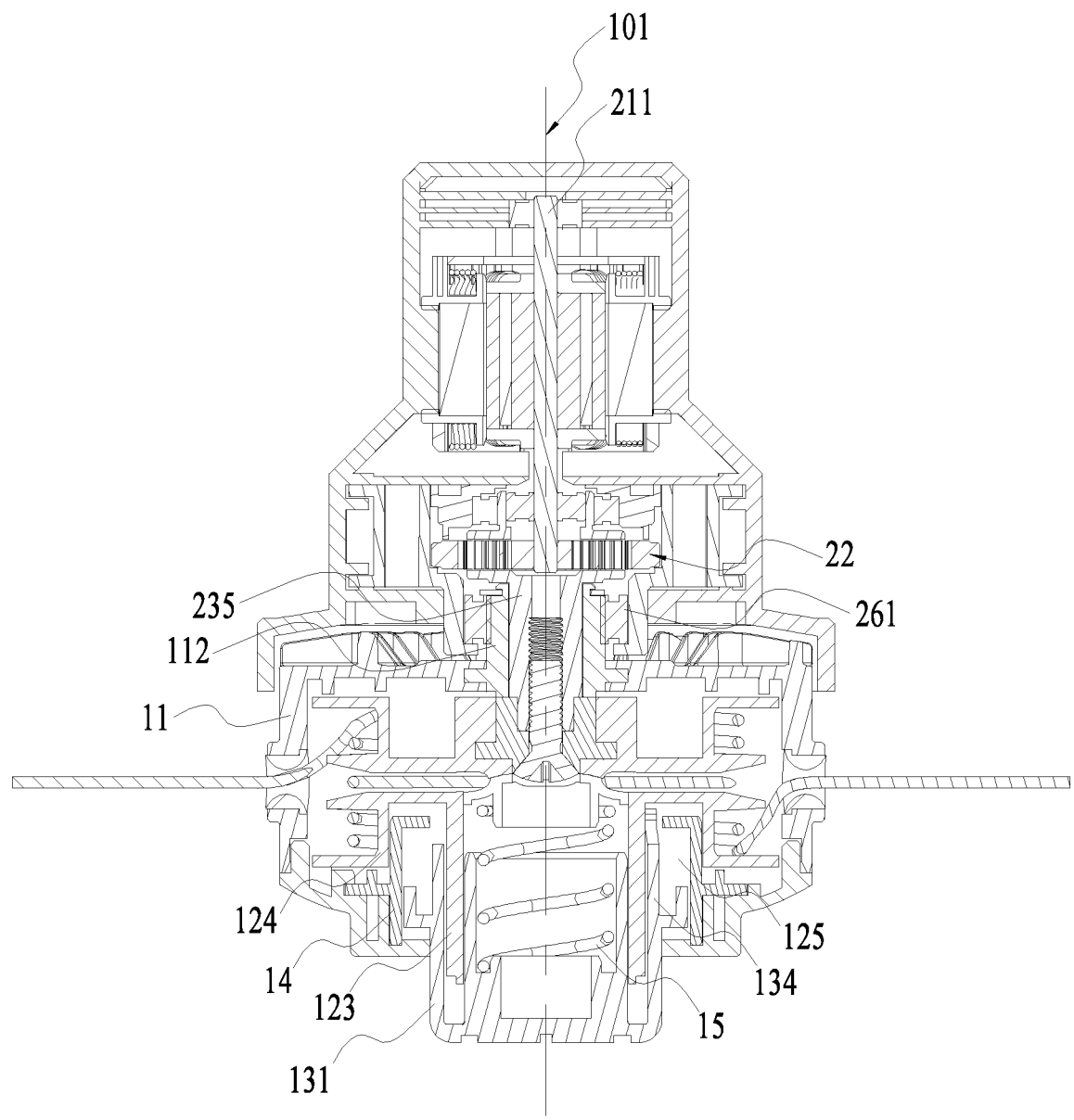
FIG. 5 is a sectional view of the structure in FIG. 3 taken along the line Z-Z.
Figure 6:
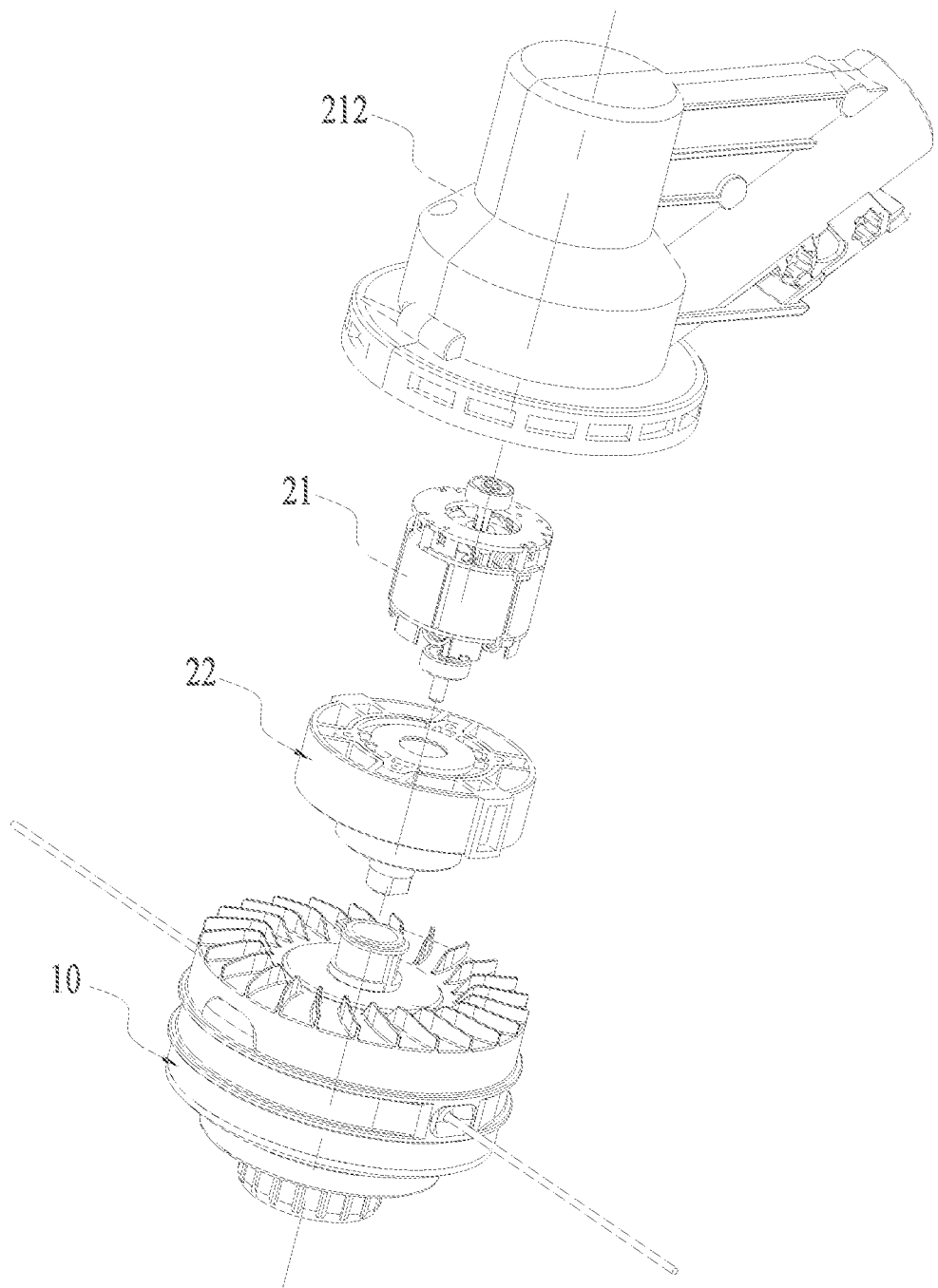
FIG. 6 is an exploded view of the structure in FIG. 2.
Figure 7:
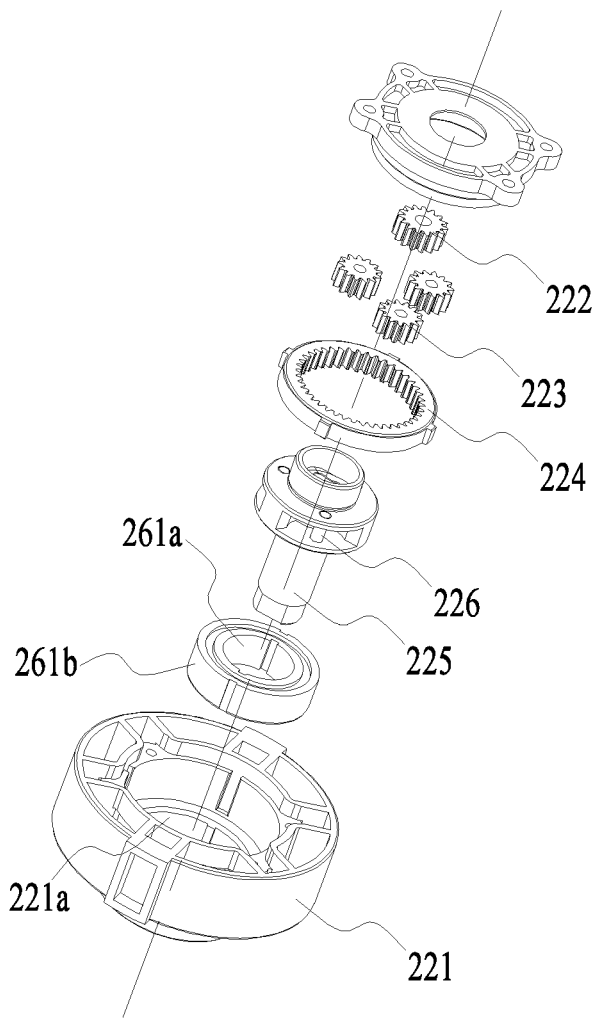
FIG. 7 is an exploded view of a transmission assembly and a limiting device in FIG. 6.
Figure 8:
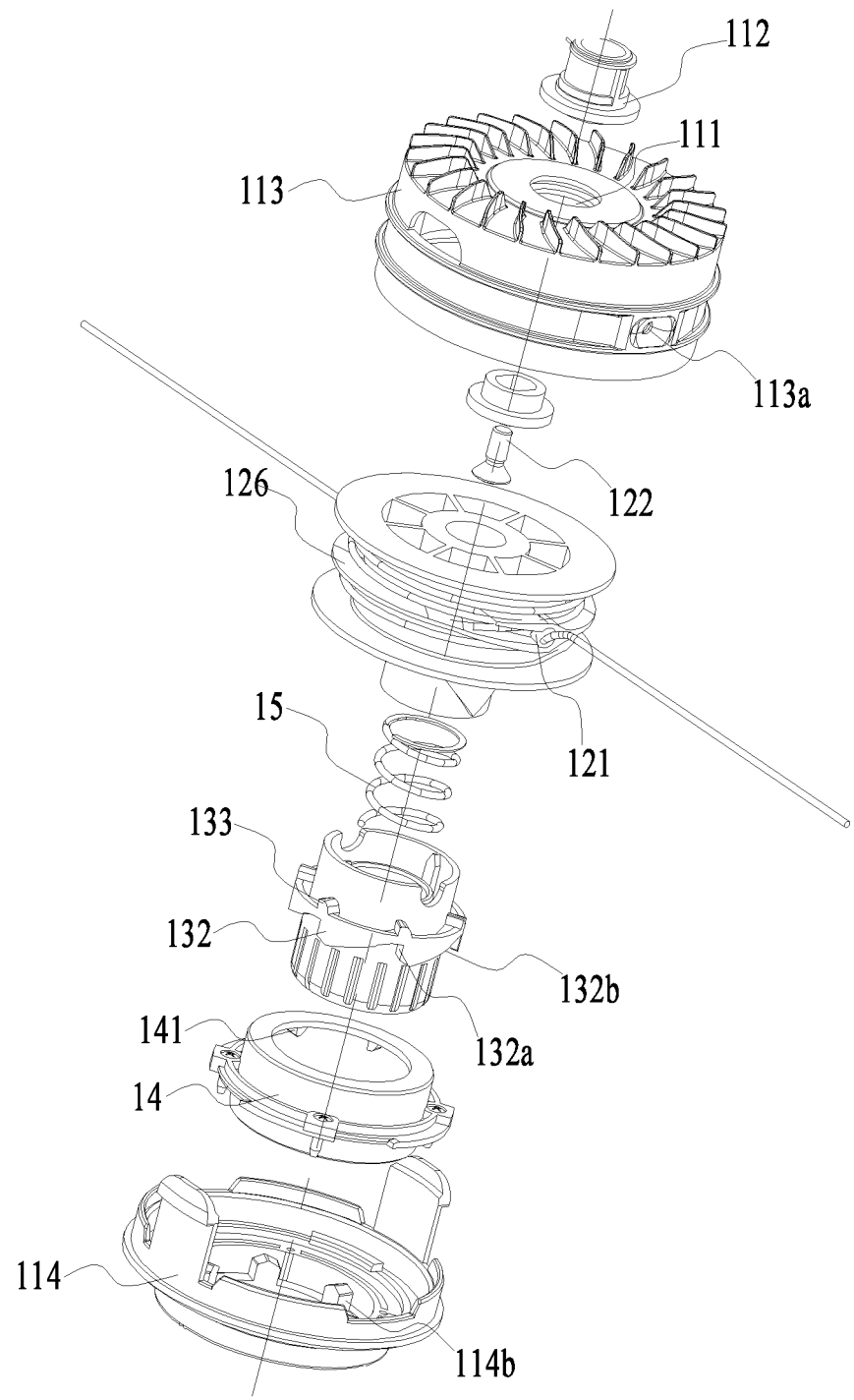
FIG. 8 is an exploded view of the trimmer head in FIG. 6.
Figure 9:
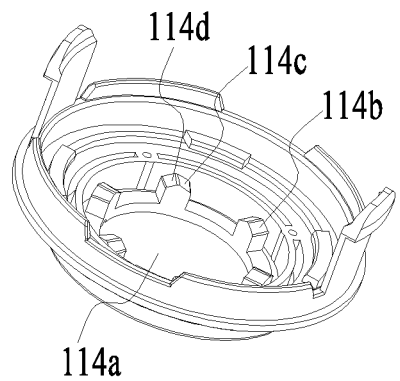
FIG. 9 is a three-dimensional view a second housing in FIG. 8.

As shown in FIGS. 5-7, the transmission assembly 22 is disposed between the motor 21 and the trimmer head 10. The transmission assembly 22 includes a gear housing 221, a solar gear 222, planet gears 223, a ring gear 224 and a driving shaft 225. The gear housing 221 is used to accommodate the solar gear 222, the planet gears 223, and the ring gear 224, and the gear housing 221 is fixed with respect to the first housing 212. The solar gear 222 and the motor shaft 211 rotate synchronously, the ring gear 224 is fixed with respect to the gear housing 221, and the planet gears 223 is disposed between the solar gear 222 and the ring gear 224. A number of the planet gears 223 is plural, the planet gears 223 rotatably mounted to the driving shaft 225 by rotation pins 226. Thus, when the motor shaft 211 drives the solar gear 222 to rotate, the planet gears 223 can rotate the driving shaft 225 about the rotation axis 101, thereby enabling the transmission assembly 22 to transmit power between the motor 21 and the trimmer head 10. Moreover, the transmission assembly 22 also reduces the rotation speed at which output from the motor 21 is delivered to the trimmer head 10.

The grass trimmer 100 further includes a limiting device 26 for limiting the rotation of the head housing 11. The restriction of the rotation of the head housing 11 by the limiting device 26 can lock the rotation of the head housing 11 relative to the first housing 212, or reduce the rotation speed of the head housing 11 relative to the first housing 212. In fact, the manual winding mode of the grass trimmer 100 is further a one-hand winding mode. In the manual winding mode or auto-winding mode, when the motor 21 drives the spool 12 to rotate in the first rotation direction about the rotation axis 101, it is sufficient that the limiting device 26 causes the spool 12 to rotate relative to the head housing 11 in the first rotation direction. In this way, as long as the position of the grass trimmer 100 is fixed, the user can rotate the operating element 13 about the rotation axis 101 with one hand. At this time, the operating element 13 drives one of the spool 12 and the head housing 11 to rotate, a relative rotation between the spool 12 and the head housing 11 for rotating the spool 12 relative to the head housing 11 in the first rotation direction is generated, thereby realizing the function that the user can wind the trimmer line 102 to the spool 12 by rotating the operating element 13 with one hand.

That is, the manual winding mode of the trimmer head 10 is realized. The user does not need to hold the head housing 11 with one hand and hold the operating element 13 with the other hand to wrap the straw cord 102. Therefore, a problem that the trimmer line 102 is wound around the arm caused by the user holding the head housing 11 with one hand and rotating the operating element 13 with the other hand is avoided. Thus, the working efficiency is improved.

In the present example, the limiting device 26 may be a one-way bearing 261, which causes the rotation of the head housing 11 relative to the first housing 212 to be locked in the first rotation direction and the rotation of the head housing 11 relative to the first housing 212 in the second rotation direction to be released. Thus, when the spool 12 is driven by the motor 21 to rotate in the second rotation direction about the rotation axis 101, the limiting device 26 does not limit the rotation of the head housing 11 in the second rotation direction, so that the head housing 11 can rotate with the spool 12 in the second rotation direction about the rotation axis 101, and the trimmer head 10 is in the cutting mode at this time. When the spool 12 is driven by the motor 21 to rotate in the first rotation direction about the rotation axis 101, the limiting device 26 limits the head housing 11 from rotating in the first rotation direction, and the head housing 11 is fixed with respect to the first housing 212, so that the spool 12 can rotate in the first rotation direction with respect to the head housing 11, and thus the trimmer head 10 is in the auto-winding mode at this time. Similarly, when the spool 12 is driven by the operating element 13 to rotate in the first rotation direction about the rotation axis 101, the limiting device 26 also limits the head housing 11 from rotating in the first rotation direction, and the head housing 11 is fixed with respect to the first housing 212, so that the spool 12 can rotate in the first rotation direction with respect to the head housing 11, and thus the trimmer head 10 is in the manual winding mode at this time.

As shown in FIGS. 4-7, the one-way bearing 261 includes an inner ring 261a and an outer ring 261b. The inner ring 261a and the head housing 11 constitute a synchronous rotation, and the outer ring 261b is fixed to the first housing 212. The gear housing 221 is formed with a receiving groove 221a, and the one-way bearing 261 is disposed in the receiving groove 221a. The one-way bearing 261 is interference-pressed into the receiving groove 221a so that the outer ring 261b of the one-way bearing 261 is fixedly connected to the gear housing 221, the gear housing 221 is fixed with respect to the first housing 212, and the outer ring 261b of the one-way bearing 261 is fixed with respect to the first housing 212. Understandably, the receiving groove 221a can also be formed by the first housing 212. The head housing 11 is provided with a through hole 111 for allowing the driving shaft 225 to pass through, and the head housing 11 is fixedly connected with a bushing 112 which is rotatably sleeved on the driving shaft 225. Thus, the driving shaft 225 can rotate relative to the head housing 11. The inner ring 261a of the one-way bearing 261 is sleeved on the outer circumference of the bushing 112 and rotates synchronously with the bushing 112. The inner ring 261a and the bushing 112 can be connected by splines, so that the head housing 11 rotates synchronously with the inner ring 261a. Therefore, the rotation of the head housing 11 with respect to the first housing 212 in the first rotation direction is restricted, and the rotation of the head housing 11 with respect to the first housing 212 in the second rotation direction is released.

As shown in FIGS. 4-9, the head housing 11 includes a first housing portion 113 and a second housing portion 114, the first housing portion 113 is formed with an outer holes 113a for threading, the second housing portion 114 is connected to the first housing portion 113, and the second housing portion 114 is configured to rotate synchronously with the first housing portion 113. When the first housing portion 113 and the second housing portion 114 are connected, the first housing portion 113 and the second housing portion 114 collectively surround to form the accommodating space 115 for accommodating the spool 12. Of course, understandably, in other examples, the outer holes 113a may also be disposed on the second housing portion 114, and the first housing portion 113 and the second housing portion 114 may also be integrally formed.

The first housing portion 113 and the second housing portion 114 constitute a detachable connection. Specifically, the first housing portion 113 and the second housing portion 114 are snap-connected. Thus, the user can remove the second housing portion 114 from the first house portion 113. At this time, the user can take the spool 12 out of the accommodating space 115, which is convenient for repairing the trimmer head 10 or replacing components.

The spool 12 is rotatably disposed in the accommodating space 115. The spool 12 is further formed with inner holes 121 for threading. When the inner holes 121 are aligned with the outer holes 113a, the user can sequentially insert the trimmer line 102 into the outer holes 113a and the inner holes 121, thereby facilitating winding the trimmer line 102 to the spool 12. The spool 12 is coupled to the driving shaft 225 by a connector 122 to form a fixed connection with the driving shaft 225.

The operating element 13 rotates synchronously with the spool 12, the spool 12 is fixed relative to the head housing 11 in a direction along the rotation axis 101, and the operating element 13 is slidably connected with the spool 12 in the direction along the rotation axis 101 or a direction parallel to the rotation axis 101. The head housing 11 is also formed with an opening 114a for the operating element 13 to partially project out of the head housing 11 in the direction along the rotation axis 101, and the opening 114a may be formed by the second housing portion 114. A portion of the operating element 13 protruding outside the head housing 11 is an operating portion 131 used to operate for the user. When the user rotates the operating portion 131, the operating element 13 can drive the spool 12 to rotate synchronously with the operating element 13.

The operating element 13 is further formed with driving portions 132, and the head housing 11 is formed with matching portions 114b for engaging with the driving portions 132. The driving portions 132 are formed with a first driving surface 132a and an arc-shaped surface 132b, and the matching portions 114b are formed with a second driving surface 114c and an inclined surface 114d. When the operating element 13 is rotated by the user in the second rotation direction about the rotation axis 101, the first driving surface 132a drives the head housing 11 to rotate synchronously with the operating element 13 by cooperating with the second driving surface 114c. That is to say, the second driving surface 114c receives a driving force of the driving portions 132 so that the head housing 11 rotates synchronously with the spool 12 in the second rotation direction. When the operating element 13 is rotated by the user in the first rotation direction about the rotation axis 101, the rotation of the head housing 11 is limited by the limiting device 26, the arc-shaped surface 132b cooperates with the inclined surface 114d of the matching portions 114b, and the inclined surface 114d allows the operating element 13 to rotate relative to the head housing 11. Of course, understandably, in other examples, the driving portions 132 can also be formed by a separate part that is different from the operating element 13. The separate part that forms the driving portions 132 may be fixedly connected to the operating element 13 by fasteners. Understandably, in the present example, the inclined surface 114d may also be a curved surface. In a term of the problem that the matching portions 114b allow the operating element 13 to rotate, the curved surface and the inclined surface 114d have substantially the same technical means, solve substantially the same technical problem, and achieving substantially the same technical effect. Therefore, it can be considered that the curved surface and the inclined surface 114d can be identical, and the same belongs to the scheme to be protected by the present disclosure. In the present example, the spool 12 and the operating element 13 constitute a synchronous rotation, the spool 12 and the head housing 11 constitute a relative sliding in the direction of the rotation axis 101, and the driving portions 132 are formed by the operating element 13. Thus, when the trimmer head 10 is in the manual winding mode or the auto-winding mode, the operating element 13 can drive the spool 12 to rotate relative to the head housing 11 in the first rotation direction to wind the trimmer line 102 onto the spool 12. During winding, the driving portions 13 rotate relative to the matching portions 114b, and the operating element 13 further slides in the direction of the rotation axis 101 with respect to the head housing 11, so that the spool 12 and the head housing 11 are kept constant in the direction of the rotation axis 101 and the position of the inner holes 121 relative to the outer holes 113a are basically constant in the direction of the rotation axis 101. Thus, in the winding process of the trimmer head 10, the problem that the trimmer line 102 is wound around one of the winding portions 124 due to the change of the positions of the inner holes 121 and the outer holes 113a in a vertical direction can be avoided, and a problem of the trimmer line 102 stuck can be avoided.

The operating element 13 can slide to a first position and a second position relative to spool 12 in the direction of rotation axis 101. When the operating element 13 slides to the first position, that is, the operating element 13 is in a driving position that can drive the head housing 11 to rotate synchronously with the spool 12, and the driving portions 132 are engaged with matching portions 114b. At this time, if the motor 21 drives the spool 12 to rotate in the second rotation direction about the rotation axis 101, the driving portions 132 will drive the head housing 11 to rotate together with the spool 12, so that the trimmer head 10 is in the cutting mode at this time. When the grass trimmer 100 is in the process of weeding, if the user makes the grass trimmer 100 hit a ground, the ground will exert a reaction force on the operating element 13 so that the operating element 13 slides to the second position along the rotation axis 101, that is, the operating element 13 is in a non-driving position where the head housing 11 does not rotate synchronously with the spool 12, and the driving portions 132 are disengaged from the matching portions 114b, thus the spool 12 rotates relative to the head housing 11 in the second rotation direction, so that the head housing 10 is in a line feeding mode and the length of the trimmer line 102 extending out of the head housing 11 is increased. In the present example, the driving portions 132 are disposed on the operating element 13 to drive the head housing 11 to rotate synchronously with the spool 12 in the second rotation direction so as to realize a mowing function. Thus, it can be understood that the operating element 13 can also be considered as an intermediate element for transmitting power between the spool 12 and the head housing 11 so as to make the spool 12 rotate synchronously with the head housing 11.

In order to prevent excessive release of the trimmer line 102 when the trimmer head 10 is in the line feeding mode, the trimmer head 10 further includes a limiting member 14 for limiting the length of the trimmer line 102 to be released. The limiting member 14 and the head housing 11 are fixedly connected or integrally molded, the limiting member 14 is provided with limiting portions 141, and the operating element 13 is provided with second matching portions 133 capable of cooperating with the limiting portions 141. When the operating element 13 is touched by the ground to disengage from the first position in the direction of the rotation axis 101, the length of the trimmer line 102 extending out of the head housing 11 is released. When the operating element 13 moves to a position where the second matching portions 133 contacts the limiting portions 141, the limiting portions 141 limit the rotation of the spool 12, so that the length of the trimmer line 102 extending out of the head housing 11 is avoided to be released excessively.

In the present example, the trimmer head 10 further includes a biasing element 15 disposed between the spool 12 and the operating element 13 to bias the operating element 13 toward the first position. The biasing element 15 may be a coil spring. Specifically, the operating element 13 is formed with a surrounding portion 134, the surrounding portion 134 surrounds the rotation axis 101, and the coil spring is disposed within the surrounding portion 134. The spool 12 is formed with a connecting portion 123 provided in the surrounding portion 134 or sheathed outside the surrounding portion 134. As such, the operating element 13 and the spool 12 at least partially overlap in the direction of the rotation axis 101, so that a size of the trimmer head 10 in the direction of the rotation axis 101 can be reduced. The winding portions 124 surround the rotation axis 101, and the surrounding portion 134 partially extends into the winding portions 124 in the direction of the rotation axis 101. That is, an annular space 125 is formed between the winding portions 124 and the connecting portion 123, and the surrounding portion 134 is at least partially disposed in the annular space 125, so that the size of the trimmer head 10 in the direction of the rotation axis 101 can be further reduced. Further, the limiting member 14 may also be at least partially disposed within the annular space 125, so that the limiting member 14 and the spool 12 also at least partially overlap in the direction of the rotation axis 101 and the size of the trimmer head 10 in the direction of the rotation axis 101 may be further reduced.

Figure 10:
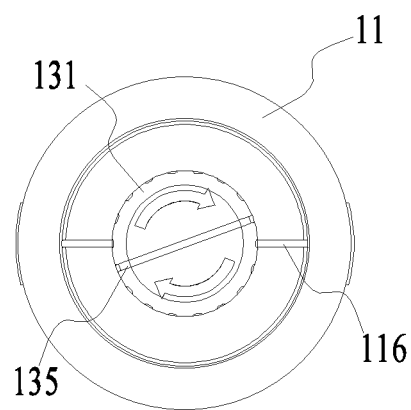
FIG. 10 is a bottom view of a head housing and an operating element in FIG. 2.

As shown in FIG. 10, for the convenience of threading, the head housing 11 is further formed with a first mark 116, and the operating portion 131 of the operating element 13 protruding outside the head housing 11 is formed with a second mark 135. When the first mark 116 is aligned with the second mark 135, the inner holes 121 are aligned with the outer holes 113a.

Figure 11:
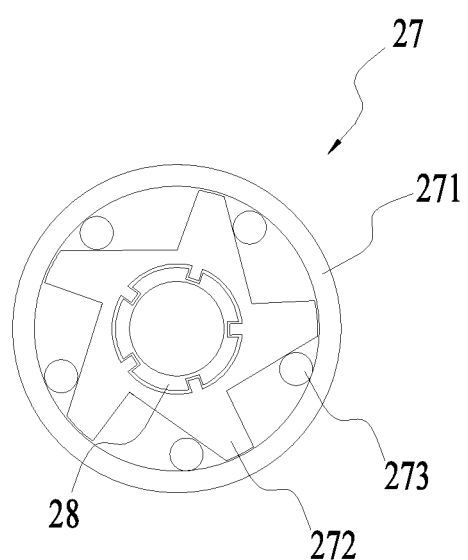
FIG. 11 is a plan view of another limiting device applicable to the grass trimmer in FIG. 1.

FIG. 11 shows another limiting device 27, which includes a lock ring 271, a rotating member 272 and a locking member 273. Wherein the lock ring 271 is set around the rotation axis, the lock ring 271 is fixed relative to the first housing, the rotating member 272 and a bushing 28 constitute synchronous rotation, and the locking member is set between the lock ring 271 and the rotating member 272. The locking member 273 is movable in a lock position and a release position. When the locking member 273 is unlocked, the rotating member 272 can rotate relative to the lock ring 271 in the second rotation direction of the rotation axis. When the locking member 273 is in the release position, the rotation of the rotating member 272 relative to the lock ring 271 is locked.

In the present example, the grass trimmer 100 further includes a control circuit. When the main switch 232 is operated to a winding position by the user, the control circuit controls the trimmer head 10 to be in the auto-winding mode. Of course, understandably, in other examples, a startup switch, independent of the main switch 232, may be provided for the user to operate to enable the trimmer head 10 to enter the auto-winding mode.

Figure 12:
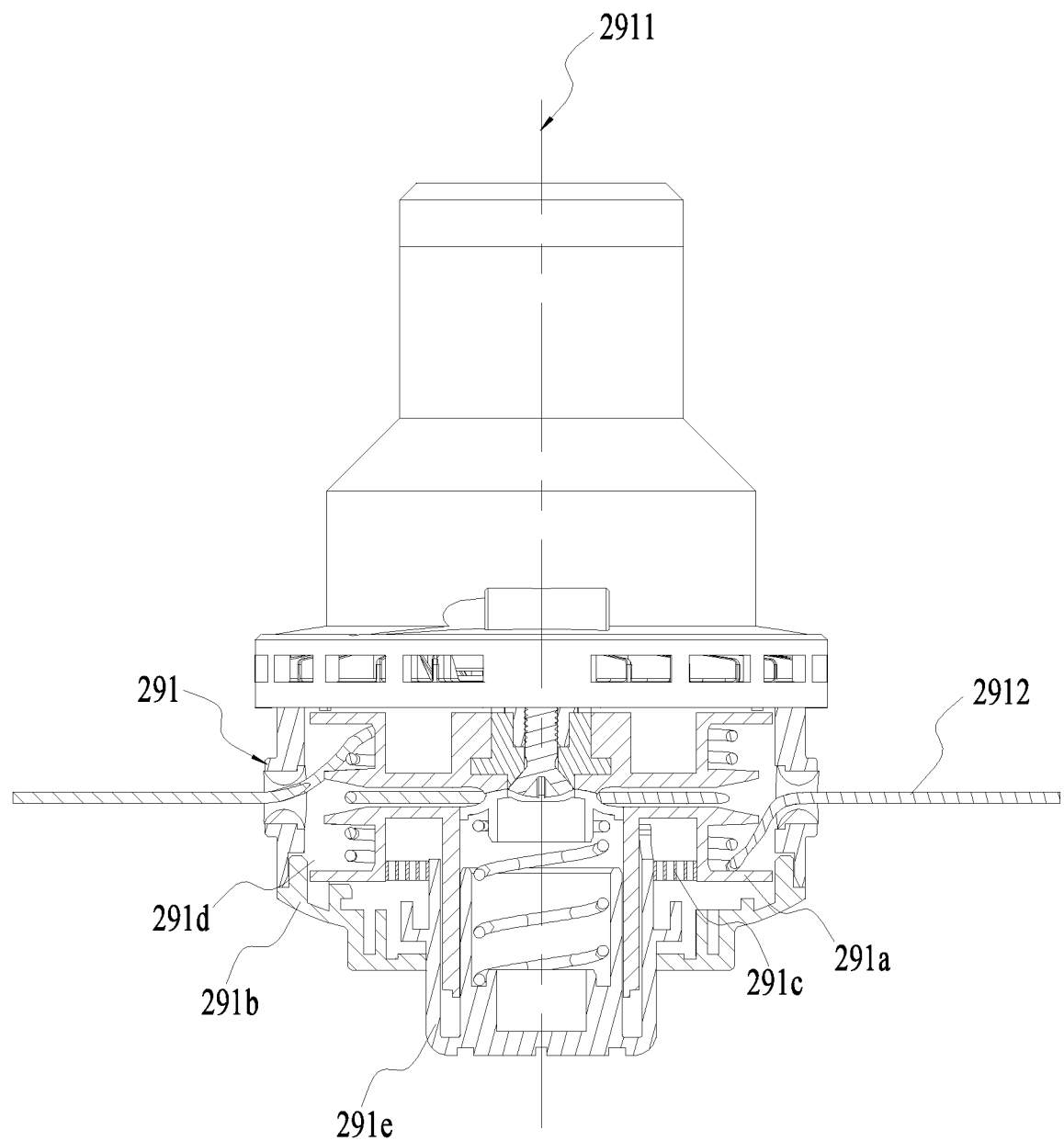
FIG. 12 is a plan view of the other driving device and trimmer head applicable to the grass trimmer in FIG. 1.
Figure 13:
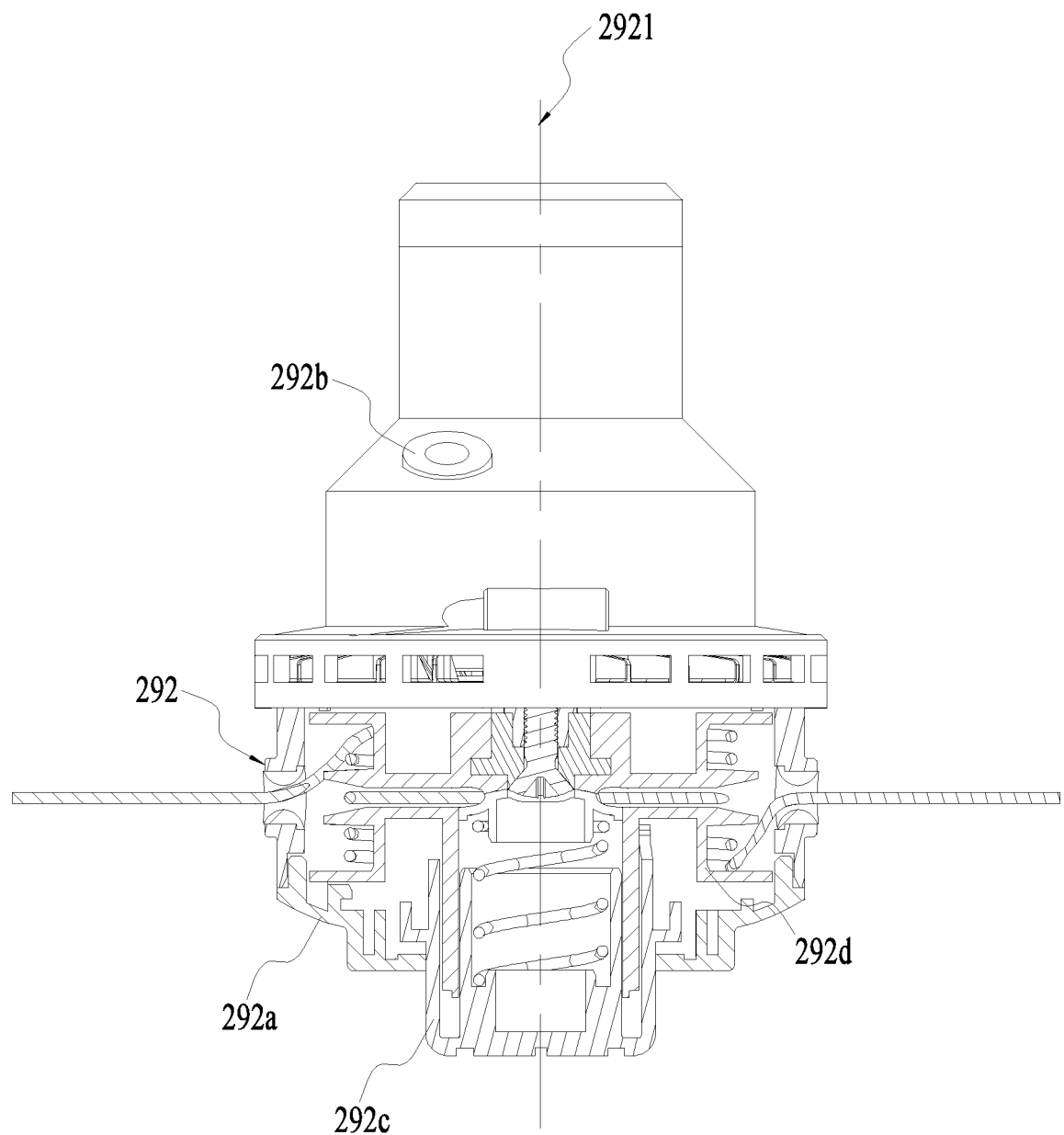
FIG. 13 is a plan view of yet other driving device and trimmer head applicable to the grass trimmer in FIG. 1.

In the present example, the trimmer head 10 is driven by the motor 21 to automatically coil the trimmer line 102 to the spool 12. Understandably, in other examples, the trimmer head 10 can also be driven by other driving assemblies to automatically coil the trimmer line 102 to the spool 12. For example, in another example shown in FIG. 12, a driving assembly is an energy storage element 291c that stores energy for driving the rotation of a spool 291a or a head housing 291b. The energy storage element 291c may be a clockwork spring disposed in an accommodating space. When a trimmer head 291 is in an auto-winding mode, the energy storage element 291c can drive the spool 291a or the head housing 291b, and the spool 291a rotates relative to the head housing 291b in a first rotation direction about a rotation axis 2911, thus a trimmer line 2912 is automatically wound to the spool 291a. When the trimmer head 291 is in a manual winding mode, a user operates an operating element 291e, the operating element 291e drives the spool 291a or the head housing 291b to rotate, and the spool 291a rotates relative to the head housing 291b in the first rotation direction about the rotation axis 2911, and the trimmer line 2912 is wound to the spool 291a. In other example as shown in FIG. 13, a trimmer head 292 further includes a lock switch 292b for locking the rotation of a head housing 292a. When the lock switch 292b is triggered, the rotation of the head housing 292a is locked. At this time, a user can operate an operating element 292c with one hand so that the operating element 292c can rotate about a rotation axis 2921, the operating element 292c drives a spool 292d to rotate, and a relative rotation between the spool 292d and the head housing 292a for rotating the spool 292d relative to the head housing 292a in a first rotation direction is generated. Alternatively, it will be understood that in other examples, the lock switch 292b may also be used to lock the rotation of the spool 292d. The operating element 292c is configured to rotate synchronously with the head housing 292a. Thus, when the lock switch 292b is triggered, the rotation of the spool 292d is locked. At this time, the user can operate the operating element 292c with one hand so that the operating element 292c can rotate about the rotation axis 2921, the operating element 292c drives the head housing 292a to rotate, and a relative rotation between the spool 292d and the head housing 292a for rotating the spool 292d relative to the head housing 292a in a first rotation direction is generated.

Figure 14:
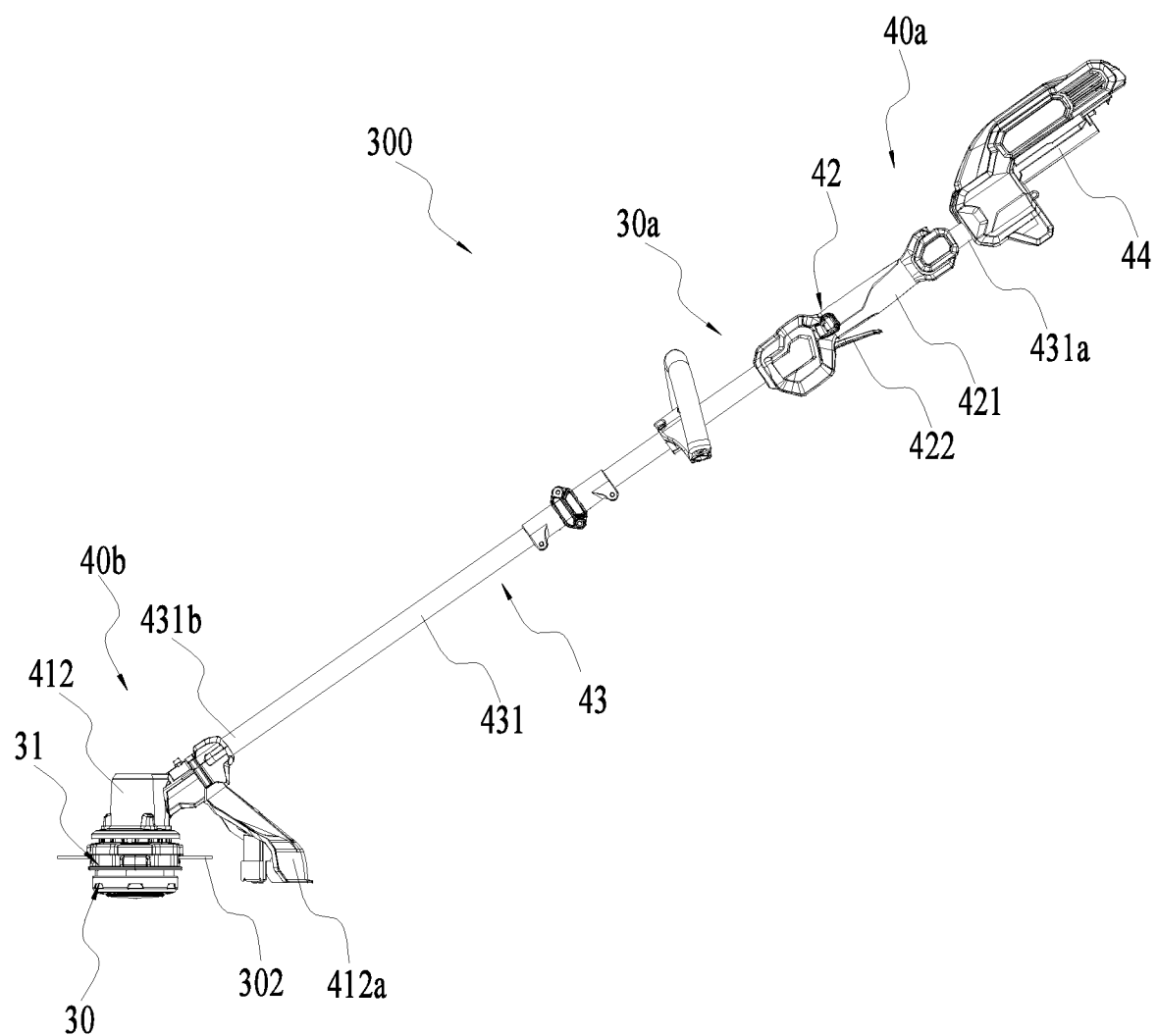
FIG. 14 is a three-dimensional view of a grass trimmer according to a second example of the present invention.

A grass trimmer 300 of a second example, which is equipped with a trimmer head 30, shown in FIG. 14 is used as a lawn trimming tool for a user to trim grass or mow vegetation. As shown in FIG. 14, the grass trimmer 300 includes the trimmer head 30 and a trimming main body 30a. The trimming main body 30a includes a driving device 41, an operating device 42, a power supply device 44 and a connecting device 43. The operating device 42 may include a handle 421 for the user to hold, and further include a main switch 422 for activating the grass trimmer 300 to trim grass. The trimmer head 30 is used for trimming grass, the driving device 41 is used for driving the trimmer head 30 to rotate around a rotation axis 301, the operating device 42 is used for the user to operate to control the grass trimmer 300, the power supply device 44 is used to power the driving device 41, the connecting device 43 is used for connecting the driving device 41, the operating device 42 and the power supply device 44 so as to make them form a whole which can move together.

The connecting device 43 in particular includes a connecting rod 431, the connecting rod 431 may extend in a straight line in the present example, the connecting rod 431 has a rear end 431a and a front end 431b located at both ends in the extending direction thereof, the power supply device 44 and the operating device 42 are disposed at the rear end 431a of the connecting rod 431, and the driving device 41 and the trimmer head 30 are disposed at the front end 431b of the connecting rod 431. Thus, a whole of the power supply device 44 and the operating device 42 can be considered as a rear end assembly 40a disposed at the rear end 431a of the connecting rod 431, and a whole of the driving device 41 and the trimmer head 30 can be considered as a front end assembly 40b disposed at the front end 431b of the connecting rod 431.

As shown in FIGS. 14-17, the driving device 41 includes a motor 411 and a first housing 412. The motor 411 is used to drive the trimmer head 30 to rotate. The motor 411 may specifically include a motor shaft 411a. In the present example, the motor 411 also rotates about the rotation axis 301. Of course, understandably, in other examples, the motor shaft 411a may also not rotate with the rotation axis 301 as an axis. For example, the motor shaft 411a may rotate about a line parallel to the rotation axis 301, and the motor shaft 411a may also rotate about a line perpendicular to the rotation axis 301. The first housing 412 is used to accommodate the motor 411, and the first housing 412 is also fixedly connected with the connecting device 43 so that the driving device 41 is connected to the connecting device 43. The first housing 412 may be formed with a receiving cavity, and the motor 41 is disposed in the receiving cavity. The first housing 412 is further connected with a shield 412a, which is also considered to be part of the front end assembly 40b.

The trimmer head 30 is used to drive a trimmer line 302 to rotate at a high speed to cut vegetation. The trimmer head 30 includes a head housing 31, a spool 32 and an operating element 33. The head housing 31 is used to accommodate the spool 32. The spool 32 is disposed in an accommodating space 315 surrounded by the head housing 31. The motor shaft 411a is a driving shaft connected to the spool 32 to drive the spool 32 to rotate, and the driving shaft drives the trimmer head 30 to rotate about the rotation axis 301. That is, the spool 32 is connected to the driving device 41 to introduce the power output from the driving device 41 into the trimmer head 30. The operating element 33 is connected to the spool 32 and at least partially protrudes to the outside of the head housing 31 for user to operate. The trimmer head 30 has a winding mode and a cutting mode. Further, the winding mode is a manual winding mode. When the trimmer head 30 is in the manual winding mode, the user can rotate the operating element 33 so that the spool 32 rotates relative to the head housing 31 in a first rotation direction about the rotation axis 301, then the trimmer line 302 can be wound onto the spool 32. When the user activates the motor 411 by operating the main switch 422, the motor 411 can drive the spool 32 to rotate in a second rotation direction about the rotation axis 301 so that the grass trimmer 300 is in the cutting mode. When the user looks from the motor 411 toward the trimmer head 30, the first rotation direction can be regarded as a counterclockwise direction and the second rotation direction can be regarded as a clockwise direction, which is not limited thereto. Understandably, in other examples, the motor shaft 411a of the motor 411 can also be connected to the head housing 31, and the operating element 33 can also rotate synchronously with the head housing 31. Thus, the user operates the operating element 33 to drive the head housing 31 to rotate so that a relative rotation of the spool 32 relative to the head housing 31 occurs, and the trimmer line 302 can be wound to the spool 32.

Specifically, as shown in FIGS. 16-23, the head housing 31 includes a first housing portion 313 and a second housing portion 314, the first housing portion 313 is formed with outer holes 314a for threading, the second housing portion 314 is connected to the first housing portion 313, and the second housing portion 314 is configured to rotate synchronously with the first housing portion 313. When the first housing portion 313 and the second housing portion 314 are connected, the first housing portion 313 and the second housing portion 314 surround to form the accommodating space 315. In the present example, the first housing portion 313 and the second housing portion 314 are snap-connected, thus the first housing portion 313 and the second housing portion 314 constitute a detachable connection. The head housing 31 is further connected with first airflow members. When the first airflow members rotate with the trimmer head 30, the first airflow members generate an airflow away from the trimmer head 30. The first airflow members are fan blades formed on the outer surface of the first housing portion 313. When the fan blades 313a rotates at a high speed, on the one hand, the fan blades 313a can prevent the grass chips from being wound onto the motor shaft 411a, and on the other hand, the fan blades 313a can dissipate heat from the motor 411. The number of the outer holes 314a is 2, and the two outer holes 314a are further disposed in the second housing portion 314.

The spool 32 is rotatably disposed in the accommodating space 315. The spool 32 is also formed with winding portions 324 for winding the trimmer line 302, a number of winding portions 324 is two, and the two winding portions 324 are spaced apart by a flange portion 325. The spool 32 is also formed with inner holes 321 for threading, and the inner holes 321 being provided at the flange portion 325. When the inner holes 321 are aligned with the outer holes 3143a, the user can sequentially insert the trimmer line 302 into the outer holes 314a and the inner holes 321, thereby facilitating passing the trimmer line 302 through the trimmer head 30.

The operating element 33 rotates synchronously with the spool 32, the spool 32 is fixed relative to the first housing 412 in a direction along the rotation axis 301, and the operating element 43 is slidably connected with the spool 32 in the direction along the rotation axis 301 or a direction parallel to the rotation axis 301. The operating element 33 is at least partially located outside the head housing 31. The head housing 31 is further formed with an opening 314b that allows the o operating element 33 to partially insert into the accommodating space 315 from the outside of the accommodating space 315 in the direction of the rotation axis 301, the opening 314b may be formed by the second housing portion 314, and at least a portion of the opening 314b can also be closed by the operating element 33. A portion of the operating element 33 protruding outside the head housing 31 is an operating portion 331 used to operate for the user. When the user rotates the operating portion 331, the operating element 33 can drive the spool 32 to rotate synchronously with the operating element 33. The operating portion 331 surrounds the second housing portion 314 about the rotation axis 301, and a gap 33a is formed between the operating portion 331 and the second housing portion 314, the gap 33a is used to communicate the interior and exterior of the accommodating space 315, so that a wear between the operating portion 331 and the second housing portion 314 can be avoided, and a movement stroke of the operating portion 331 in the direction of the rotation axis 301 can be provided. Understandably, in order to prevent dust from entering the gap 33a, a dust-proof structure may also be provided at the gap 33a.

In the present example, the operating portion 331 surrounds at least a portion of the head housing 31 in a circumferential direction around the rotation axis 301, such that the head housing 31 is at least partially located in a space surrounded by the operating portion 331 and the diameter of the operating portion 331 is larger. Thus, the user can more easily rotate the operating element 33. Furthermore, a portion of the operating portion 331 located outside the accommodating space 315 for the user to operate has a projection in a plane perpendicular to the rotation axis 301, the area of the projection is greater than or equal to 50 square millimeters and less than or equal to 80 square millimeters, which makes the operating portion 331 more of a match with the user's hand, thereby improving the operation comfort.

In order to enable the motor 411 to drive the trimmer head 30 to rotate in the second rotation direction about the rotation axis 301 to realize a mowing function, the trimmer head 30 further includes an intermediate element 34 for transmitting a torque between the spool 32 and the head housing 31. The intermediate element 34 is configured to rotate synchronously with the spool 32. The intermediate element 34 is configured to be slidably connected to the spool 32 in the direction along the rotation axis 301. In the present example, the intermediate element 34 is fixedly connected to the operating element 33 by screws 341. A whole of the intermediate element 34 and the operating element 33 rotates synchronously with the spool 32, a number of parts used to transfer torque between the spool 32 and the head housing 31 is not limited to one, but may also be multiple, in which case the intermediate element 34 can be understood as one of a plurality of parts, and the whole is slidable with respect to the spool 32 in the direction along the rotation axis 301. Understandably, in other examples, the intermediate element 34 may also be integrally formed with the operating element 33. Understandably, a number of parts used to transmit the torque between the spool 32 and the head housing 31 is not limited to one, but may be multiple, and in which case the intermediate element 34 may be understood as one of a plurality of parts.

Figure 24:
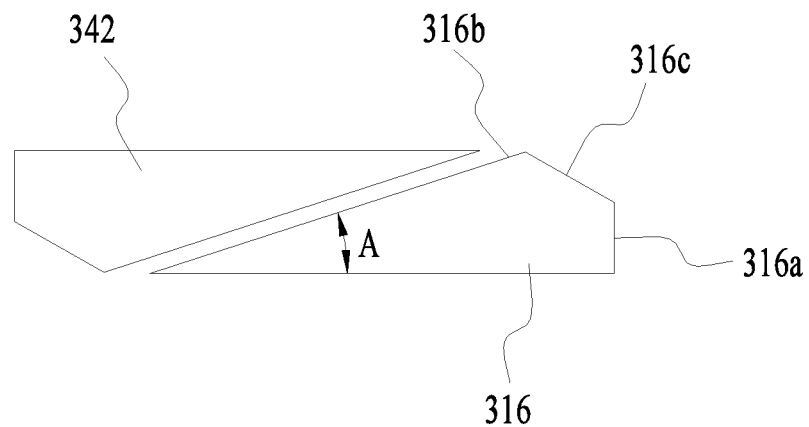
FIG. 24 is a plan view of a driving portion and a mating portion in FIG. 18.

The intermediate element 34 is further formed with driving portions 342, and the head housing 31 is formed with matching portions 316 for engaging with the driving portions 342. Specifically, as shown in FIG. 24, the matching portions 316 are formed with a driving surface 316a and an inclined surface 316b. When the driving portions 342 are in contact with the driving surface 316a of the matching portions 316, the driving surface 316a prevents the spool 32 from rotating with respect to the head housing 31 in the second rotation direction to receive the driving force of the driving portions 342. At this time, if the motor 411 drives the spool 32 to rotate in the second rotation direction about the rotation axis 301, the head housing 31 rotates synchronously with the spool 32 in the second rotation direction about the rotation axis 301 by the cooperation of the driving portions 342 and the driving surface 316a, thereby realizing a mowing function. When the user rotates the operating element 33 to rotate in the first rotational direction about the rotation axis 301, the inclined surface 316b of the matching portions 316 will allow the driving portions 342 to slide along the inclined surface 316b, so that a whole of the intermediate element 34, the operating element 33 and the spool 32 can rotate relative to the head housing 31 in the first rotation direction about the rotation axis 301, so that the trimmer line 302 can be wound onto the spool 32 to realize a winding function. In the present example, when the winding is required, the user holds the head housing 31 with one hand and rotates the operating element 33 in the first rotation direction about the rotation axis 301 with the other hand. At this time, the inclined surface 316b allows the spool 32 to rotate relative to the head housing 31 about the rotation axis 301. Of course, understandably, in other examples, the trimmer head 30 may also be provided with a limiting device for limiting the rotation of the head housing 31. Thus, the user does not need to hold the head housing 31 with one hand and rotate the operating element 33 with the other hand to realize the winding function. As long as the position of the grass trimming 300 is fixed, the user can rotate the operating element 33 with one hand to realize that the trimmer line 302 is wound onto the spool 32, thereby avoiding the problem of the trimmer line 302 wound on an arm. Understandably, in other examples, when the head housing 31 is connected to the motor 411 and the driving force output from the motor 411 is introduced into the trimmer head 30, the operating element 33 and the intermediate element 34 can rotate synchronously with the head housing 31, and the intermediate element 34 is slidably connected with the head housing 31. Thus, through the intermediate element 34 transferring a power, the spool 32 can move synchronously with the head housing 31 to realize the mowing function.

The operating element 33 can slide to a first position and a second position relative to spool 32 in the direction of rotation axis 301. When the operating element 33 slides to the first position, the intermediate element 34 will slide to the first position along with the operating element 33 in the direction of the rotation axis 301, and the driving portions 342 will be engaged with matching portions 316. At this time, if the motor 411 drives the spool 32 to rotate in the second rotation direction about the rotation axis 301, the driving portions 342 will drive the head housing 31 to rotate together with the spool 32, so that the trimmer head 30 is in the cutting mode. When the grass trimmer 300 is in the process of weeding, if the user makes the grass trimmer 30 hit a ground, the ground will exert a reaction force on the operating element 33 so that the operating element 33 slides to the second position along the rotation axis 301, the intermediate element 34 slide to a non-driving position along with the operating element 33 in the direction of the rotation axis 301, and the driving portions 342 are disengaged from the matching portions 316, thus the spool 32 rotates relative to the head housing 31 in the second rotation direction, so that the head housing 30 is in a line feeding mode and the length of the trimmer line 302 extending out of the head housing 31 is increased.

Specifically, the intermediate element 34 includes an annular portion 343, the annular portion 343 surrounds the rotation axis 301, the driving portions 342 are driving teeth, the driving teeth extend from the annular portion 343 in a radial direction away from the rotation axis 301, a number of the driving teeth are at least two, a plurality of the driving teeth are sequentially arranged in a circumferential direction around the rotation axis 301, the matching portions 316 are matching teeth formed on the head housing 31 for engaging with the driving teeth, a number of the matching teeth are the same as the number of the driving teeth, and the matching teeth are sequentially arranged in a circumferential direction around the rotation axis 301.

The second housing portion 314 of the head housing 31 further includes a bottom surface 314c at least partially extending in a plane perpendicular to the rotation axis 301, and the matching portions 316 are located on a side of the bottom surface 314c close to the accommodating space 315. The opening 314b of the head housing 31 is also formed by the bottom surface 314c. When the intermediate element 34 is fixedly connected to the operating element 33, the driving portions 342 of the intermediate element 34 are located on a side of the bottom surface 314c close to the spool 32, and the operating portion 331 is located on the other side of the bottom surface 314c away from the spool 32. A projection of the drive portions 342 in a plane perpendicular to the rotation axis 301 is located outside a projection of the opening 314b in the plane, so that the bottom surface 314c prevents a whole of the intermediate element 34 and the operating element 33 from being disengaged from the second housing portion 314 downward in the direction along the rotation axis 301. A projection of the operating portion 331 in the plane perpendicular to the rotation axis 301 is also located outside the projection of the opening 314b in the plane, so that the bottom surface 314c also prevents the whole of the intermediate element 34 and the operating element 33 from being disengaged from the second housing portion 314 upward in the direction along the rotation axis 301. In order to avoid excessive release of the trimmer line 302 when the trimmer head 30 is in the line feeding mode, the bottom surface 314c is formed with limiting teeth 317 for limiting an angle at which the spool rotates with respect to the head housing 31 and the limiting teeth 317 are located on the side of the bottom surface 314c away from the accommodating space 315. Specifically, the trimmer head 30 further includes a biasing element 35, which is biased, and set between the spool 32 and the operating element 33. The biasing element 35 biases the operating element 33 towards the first position, and the biasing element 35 can be a coil spring. The inclined surface 316b of the matching portions 316 and the driving portions 342 form a sliding fit, so that the inclined surface 316b can allow the whole of the intermediate element 34 and the operating element 33 to slide with respect to the matching portions 316 along the inclined surface 316b. In the present example, the inclined surface 316b obliquely intersects with a plane perpendicular to the rotation axis 301 to form an angle A. The angle A is greater than or equal to 12 degrees and less than or equal to 45 degrees. Furthermore, the angle A is greater than or equal to 15 degrees and less than or equal to 25 degrees. The number of the driving portions 342 is the same as a number of the inner holes 321, the number of the driving portions 342 is 6, the number of the inner holes 321 is 6, the number of the matching portions 316 is the same as the number of the inner holes 321, and the number of the matching portions 316 is 6. Further, the position of the matching portions 316 in the circumferential direction corresponds to the position of the inner holes 321 in the circumferential direction. Thus, when the matching portions 316 slides to a position cooperating with the driving surface 316a along the inclined surface 316b, the inner holes 321 is at least partially aligned with the outer holes 314a so that the trimmer line 302 passes through the inner holes 321 and the outer holes 314a in turn, so that it is easy for a user to pass the trimmer line 302 through the outer holes 314a and the inner holes 321 in turn without adjusting the relative positions of the inner holes 321 and the outer holes 314a. That is, regardless of how the user rotates the operating element 33, when the user stops operating the operating element 33, under the force of biasing element 35, the driving portions 342 can be reset to the position contacted with the driving surface 316a, so that the inner holes 321 and the outer holes 314a can be aligned automatically.

Figure 25:
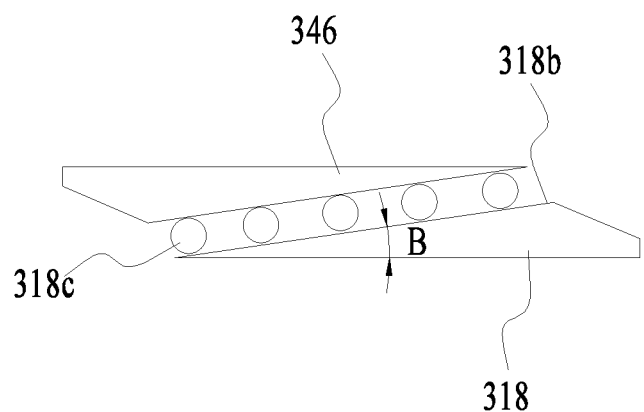
FIG. 25 is a plan view of another driving portion and a mating portion applicable to the grass trimmer in FIG. 14.

Further, the driving surface 316a extends in a plane parallel to the rotation axis 301, each of the matching portions 316 further includes a connecting surface 316c disposed between the driving surface 316a and the inclined surface 316b, the connecting surface 316c respectively connects the driving surface 316a and the inclined surface 316b, and a plane in which the connecting surface 316c is located obliquely intersects with the rotation axis 301. Thus, the height of the driving surface 316a in the direction along the rotation axis 301 may be set smaller than the height of the inclined surface 316b in the direction along the rotation axis 301, and furthermore, the size of the matching portion 316 in the direction along the rotation axis 301 may be reduced as much as possible, so that the size of the trimming 30 in the direction along the rotation axis 301 can be reduced, thereby facilitating the miniaturization of the trimmer head 30. More specifically, the height of the inclined surface 316b in a direction parallel to the rotation axis 301 is greater than or equal to 3 mm and less than or equal to 10 mm, and further, the height of the inclined surface 316b in a direction parallel to the rotation axis 301 is greater than or equal to 5 mm and less than or equal to 8 mm. The inclined surface 316b, the connecting surface 316c, and the driving surface 316a are sequentially connected. Thus, when the trimmer head is in the winding mode, the driving portions 342 can slide in a direction that sequentially contacts the inclined surface 316b, the connecting surface 316c, and the driving surface 316a. In other examples, as shown in FIG. 25, the driving portions 346 and the matching portions 318 may constitute a rolling fit. In particular, the inclined surface 318b may be formed with a groove, the trimmer head 30 further includes rolling members 318c at least partially disposed within the groove. When the driving portions 346 cooperate with the inclined surface 318b, the rolling members 318c contact with the matching portions 318. Thus, the angle B formed by the inclined surface 318b and the plane perpendicular to the rotation axis 301 can be further reduced. The angle B is greater than or equal to 1 degree and less than or equal to 45 degrees, thereby further reducing the size of the matching portions 318 along the rotation axis 301 and being beneficial to the development of miniaturization of trimmer head.

In the present example, the operating element 33 is further connected with a contact member 36, and the contact member 36 is further connected with the operating portion 331 of the operating element 33. The contact member 36 is located outside the accommodating space 315, and the contact member 36 further includes a contact surface 361 for contacting a ground when the trimmer head is mowing grass. The contact member 36 and the operating element 33 form a rotational connection about the rotation axis 301. Thus, when the trimmer head 30 is mowing grass, the trimmer head 30 rotates at a high speed about the rotation axis 301, and the rotational speed of the trimmer head 30 is up to several thousand revolutions per minute, and the contact between the contact member 36 and the ground can effectively prevent the abrasion of the trimmer head 30, thereby increasing the service life of the trimmer head 30. The contact member 36 is rotatably connected to the operating element 33 by a connecting member 362, furthermore, the connecting member 362 is a one-way bearing, and the one-way bearing allows the contact member 36 to rotate relative to the operating element 33 along the first rotation direction about the rotation axis 301 and prevents the contact member 36 from rotating relative to the operating element 33 along the second rotation direction about the rotation axis 301. The operating element 33 and the contact member 36 are integrally configured to close the opening 314b formed by the second housing portion 314.

In the present example, the operating element 33 and the spool 32 constitute a synchronous rotation, and the spool 32 is fixed at a position in the direction of the rotation axis 301 with respect to the first housing 412. The trimmer head 30 further includes an axial stop member 37 for restricting the head housing 31 from moving relative to the first housing 412 in the direction of the rotation axis 301. Thus, when the trimmer line 302 is wound, the position of the inner holes 321 in the direction parallel to the rotation axis 301 remains unchanged with respect to the position of the outer holes 314a in the direction, so that the problem of unilateral winding of the trimmer line 302 can be avoided.

As shown in FIGS. 19-23, the operating element 33 at least partially passes through the opening 314b such that a portion of the operating element 33 is positioned on the side of the bottom surface 314c close to the accommodating space 315, and the operating portion 331 is positioned on the other side of the bottom surface 314c. The driving portions 342 of the intermediate element 34 is positioned on the side of the bottom surface 314c close to the accommodation space 315, and the screws 341 fixedly connect the intermediate element 34 to the operating element 33, whereby the intermediate element 34, the operating element 33 and the second housing portion 314 form an integral whole. The spool 32 is connected to the motor 411, and the spool 32 can limit the first housing portion 313 to limit the first housing portion 313 from disengaging from the spool 32. At this time, the user grasps the first housing portion 313 with one hand and the second housing portion 314 with the other hand, and then snaps the second housing portion 314 onto the first housing portion 313, thereby realizing the mounting of the trimmer head 30.

The operating element 33 is further formed with guiding portions 332. When the second housing portion 314 is mounted toward the first housing portion 313, the guiding portion 332 can guide the spool 32 to rotate about the rotation axis 301 to a position where the inner holes 321 and the outer holes 314a are at least partially aligned. After the assembly of the trimmer head 30 is completed and the spool 32 is located at an insertion position, and the user can conveniently and quickly pass the trimmer line 302 through the outer holes 314a and the inner holes 321 from the outside, thereby realizing the function of automatically aligning the inner holes 321 and the outer holes 314a after the trimmer head 30 is assembled.

More specifically, the spool 32 is formed with a connecting portion 322 arranged around the rotation axis 301, the operating element 33 is formed with a surrounding portion 333 at least partially inserted into the connecting portion 322, and the surrounding portion 333 is also arranged around the rotation axis 301. The guiding portions 332 are formed on the outer periphery of the surrounding portion 333, and the guiding portions 332 include driving grooves 332a and guiding grooves 332b. The driving grooves 332a extend in a direction parallel to the rotation axis 301, and the inner periphery of the connecting portion 322 is formed with protrusions 322a that can be inserted into the driving grooves 332a. The protrusions 322a extend in a direction parallel to the rotation axis 301. And when the protrusions 322a and the driving grooves 332a cooperate with each other, the operating element 33 rotates synchronously with the spool 32. The guiding grooves 332b are provided at one end of the driving grooves 332a, and the guiding grooves 332b guide the projections 322a to move into the driving grooves 332a. The guiding grooves 332b include guiding groove walls 332c extending in a plane inclined to intersect with the rotation axis 301, a number of guiding groove walls 332c is two, and the two guiding groove walls 332c cause the guiding grooves 332b to have a trumpet shape, thereby enabling more accurate guide protrusions 322a to move into the driving grooves 332a. In the present example, a number of the guide portions 332 is at least two, and the number of the guide portions 332 is the same as the number of the inner holes 321. For example, in the present example, the number of the guide portions 332 is six.

Figure 17:
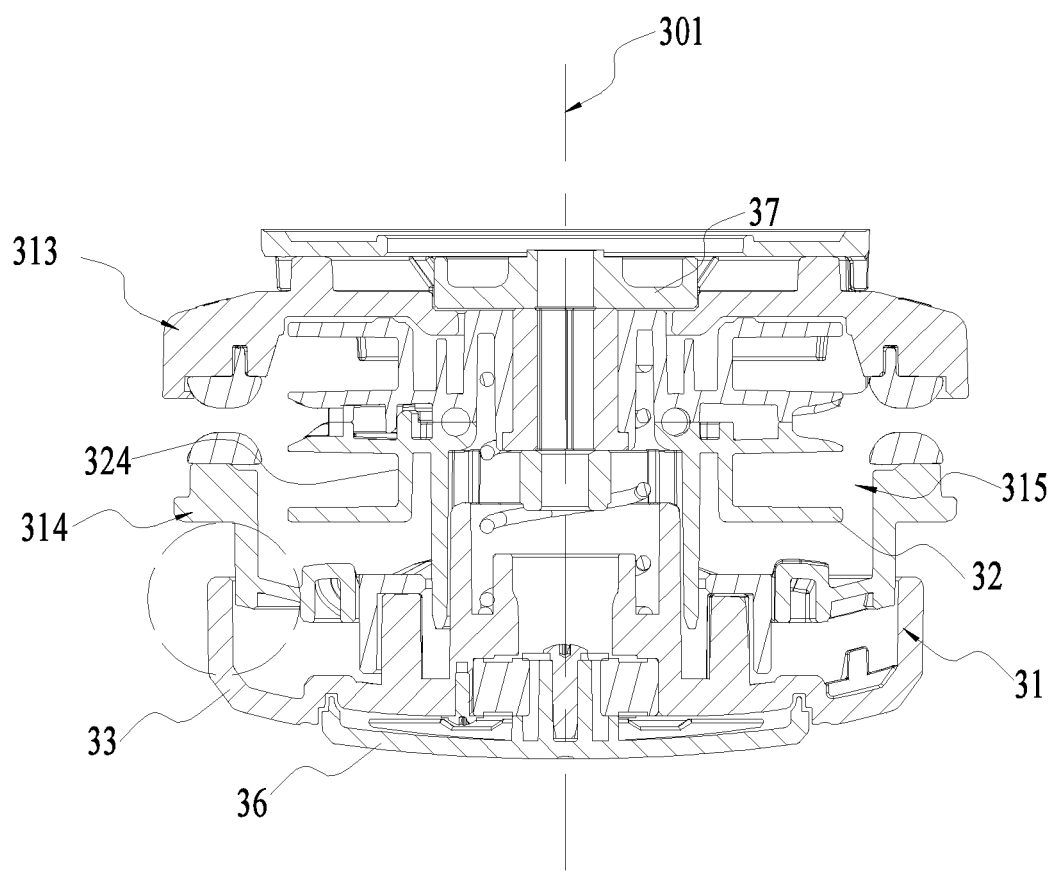
FIG. 17 is a sectional view of the trimmer head in FIG. 16.
Figure 18:
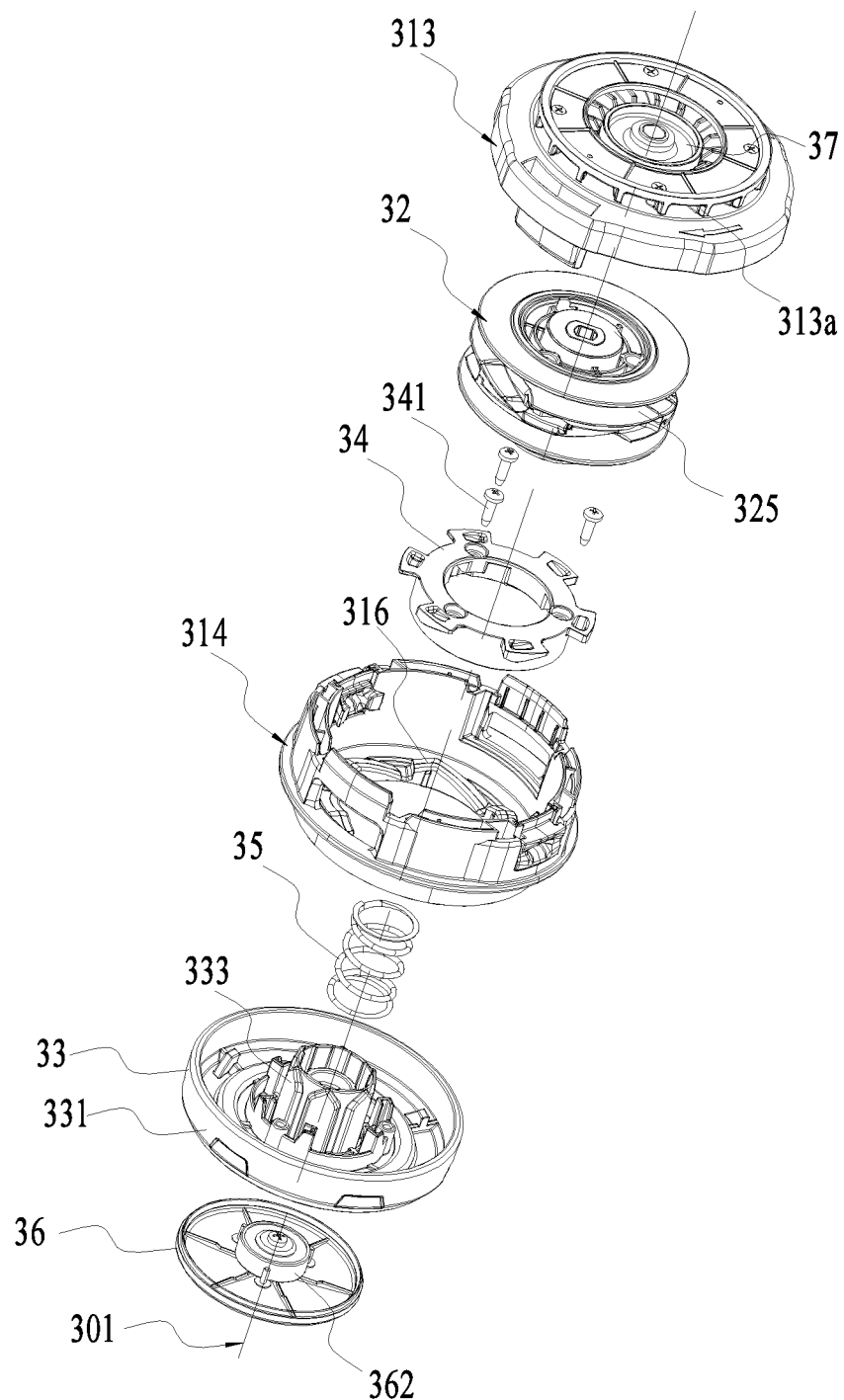
FIG. 18 is an exploded view of the trimmer head in FIG. 16.
Figure 19:
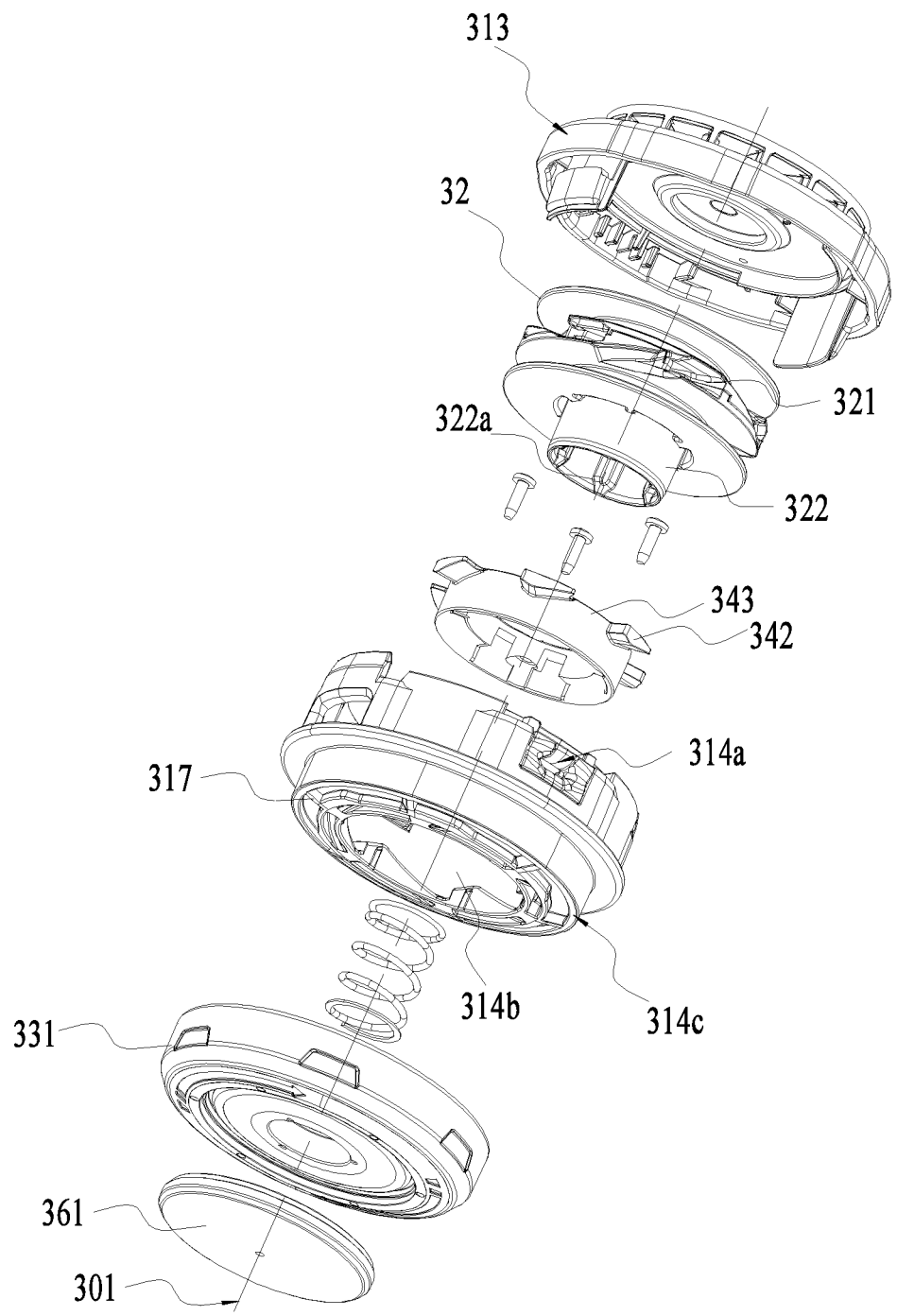
FIG. 19 is a three-dimensional view of another angle of the structure in FIG. 18.
Figure 20:
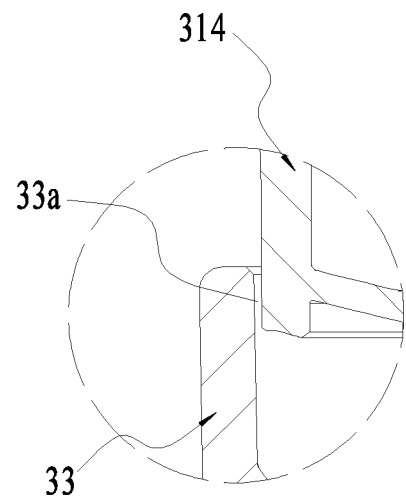
FIG. 20 is an enlargement schematic view of a portion of the structure in FIG. 17.
Figure 21:
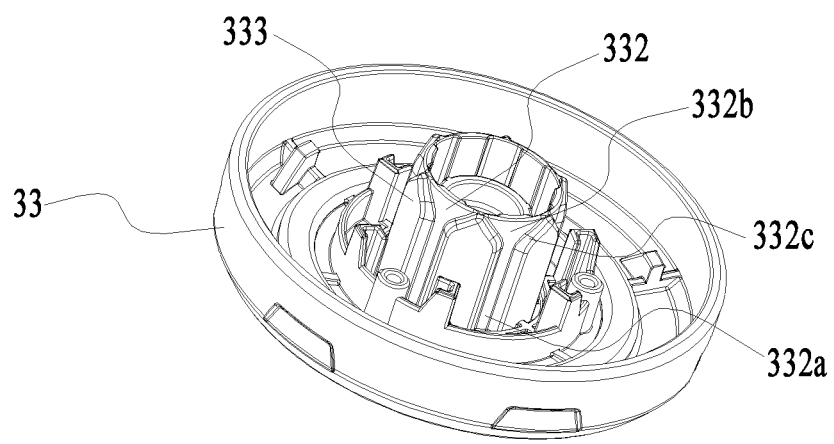
FIG. 21 is a three-dimensional view of an operating element in FIG. 18.
Figure 22:
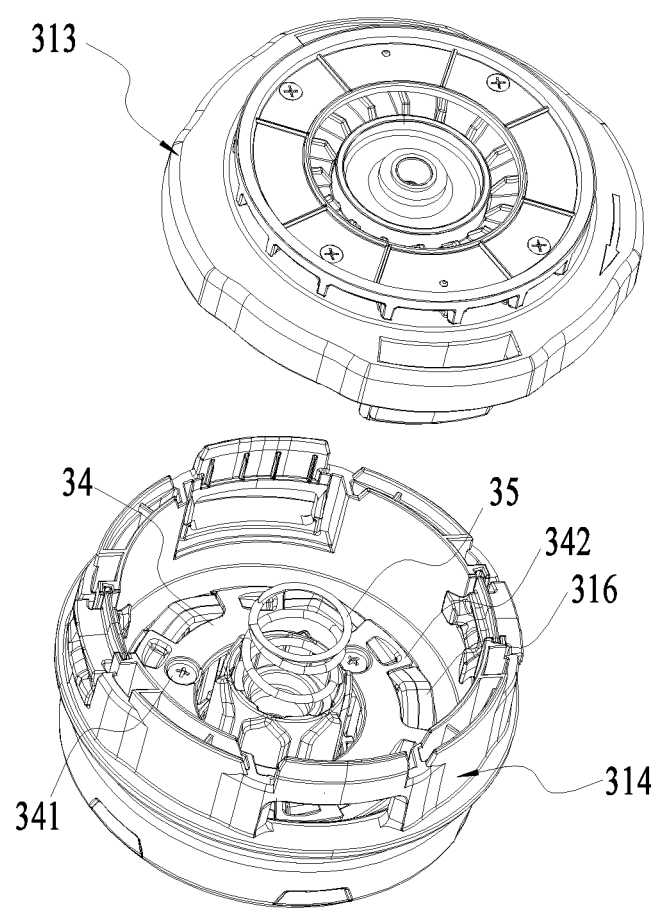
FIG. 22 is a three-dimensional view of a head housing, the operating element, an intermediate element and a biasing element in FIG. 18.
Figure 23:
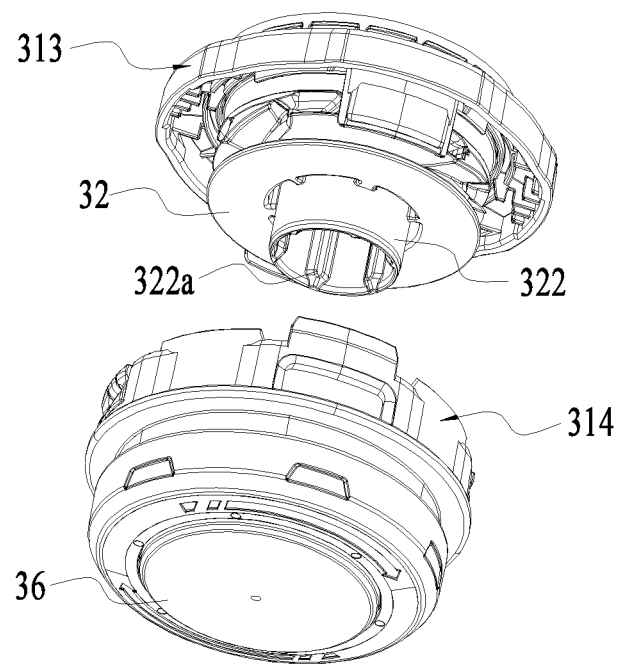
FIG. 23 is a three-dimensional view of another angle of the structure in FIG. 22.
Figure 26:
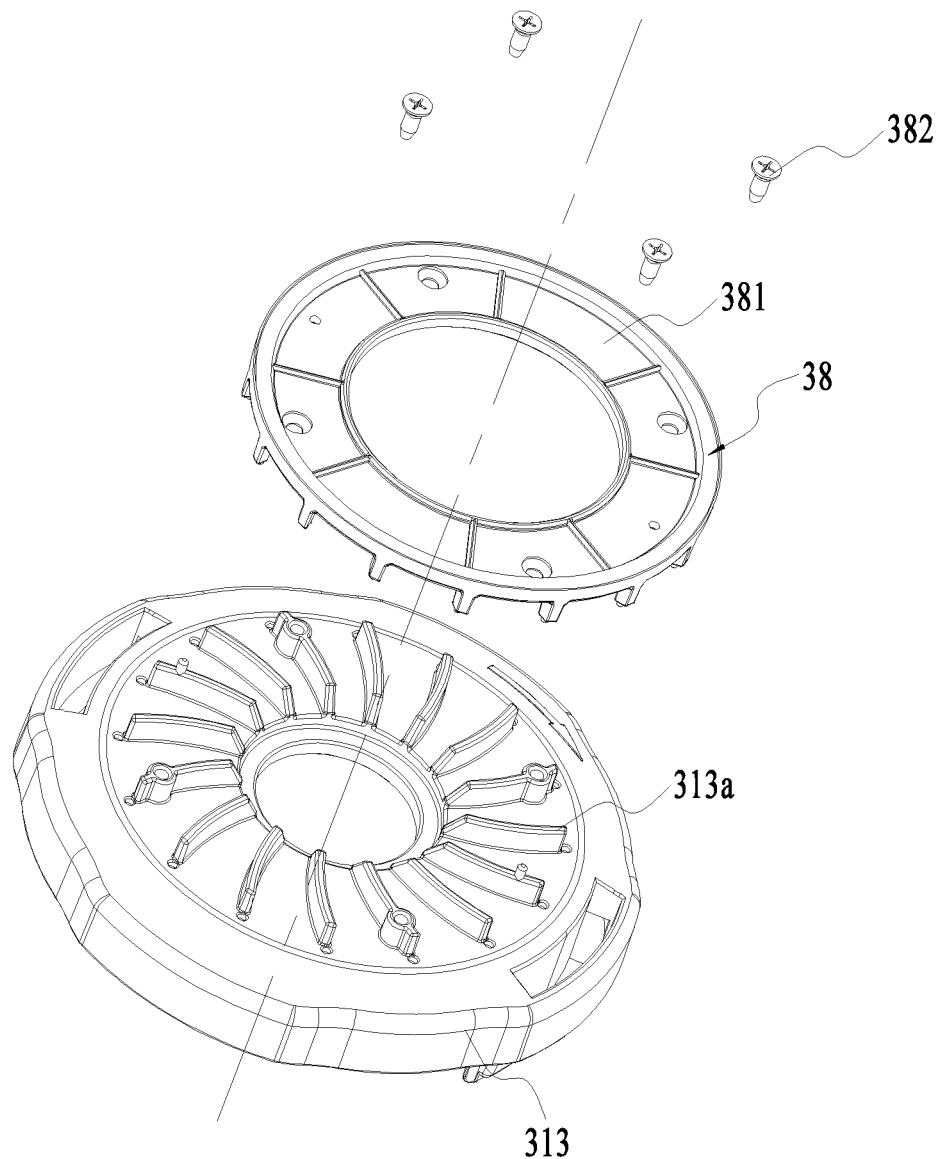
FIG. 26 is an exploded view of a first housing portion and anti-winding cover in FIG. 17.

As shown in FIGS. 17, 18 and 26, the trimmer head 30 also includes an anti-winding cover 38, the anti-winding cover 38 is used to prevent weeds from wrapping onto the motor shaft 411a located in a gap between the fan blades 313a and the first housing 412. The anti-winding cover 38 includes a contact portion 381 in contact with the fan blades 313a, and the anti-winding cover 38 and the fan blades 313a are fixedly connected by screws 382 and can rotate synchronously with the fan blades 313a. Thus, when the trimmer head 30 rotates at a high speed, since the anti-winding cover 38 rotates at the high speed with the fan blades 313a and the anti-winding cover 38 spaces the fan blades 313a from the first housing 412, weeds are not wound into the gap between the anti-winding cover 38 and the head housing 31. Thus, weeds are not wound on the motor shaft 411a, hereby achieving the purpose of anti-winding weeds.

Figure 15:
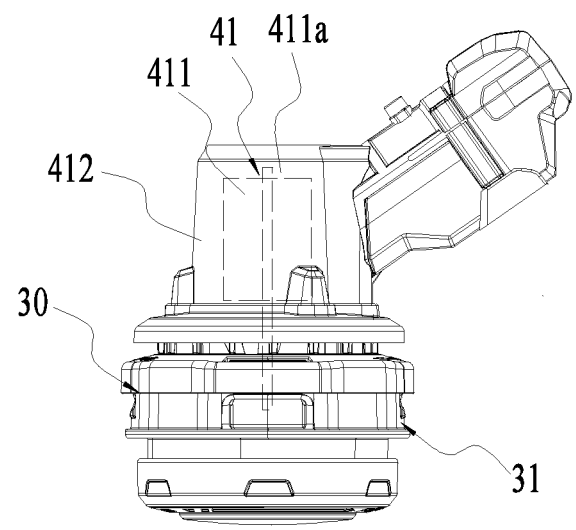
FIG. 15 is a plan view of a driving device and a trimmer head in FIG. 14.
Figure 16:
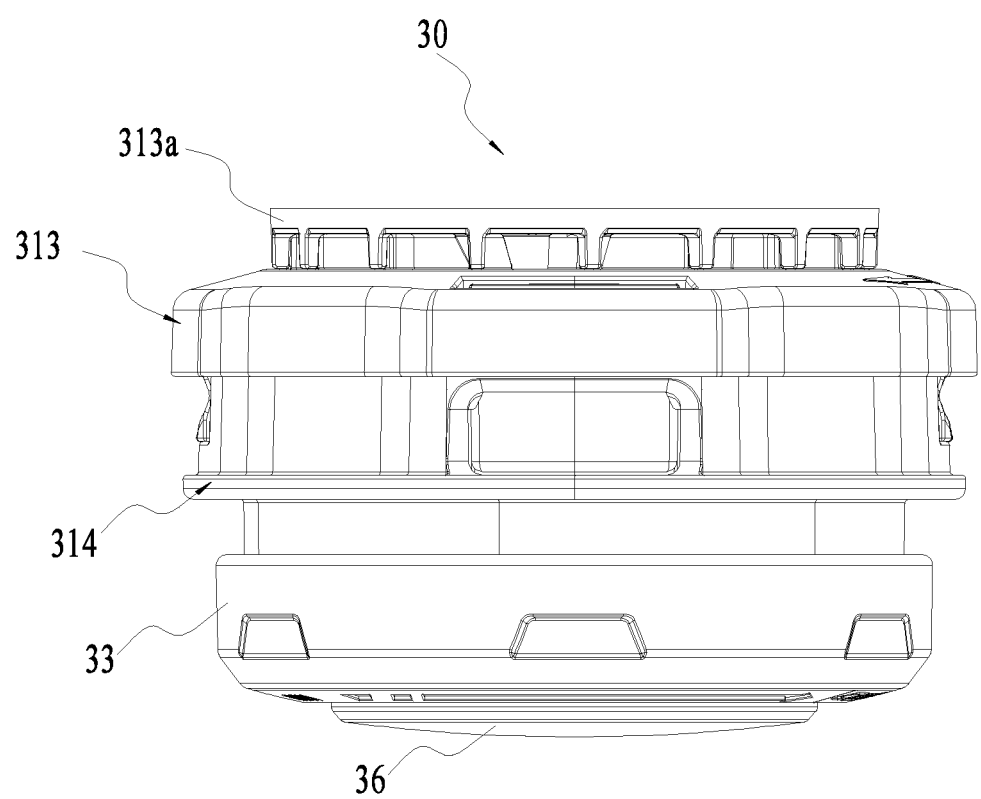
FIG. 16 is a plan view of the trimmer head in FIG. 15.
Figure 27:
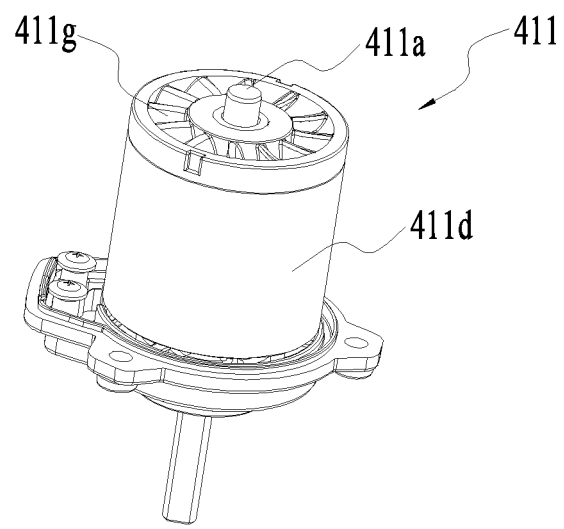
FIG. 27 is a three-dimensional view of a motor in FIG. 15.
Figure 28:
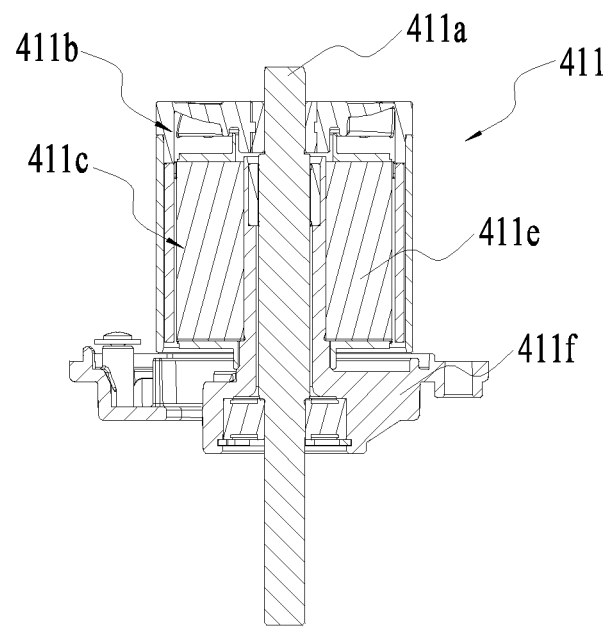
FIG. 28 is a sectional view of the motor in FIG. 27.

As shown in FIG. 15, FIG. 27 and FIG. 28, the motor 411 is specifically an electric motor, and the electric motor is further a brushless electric motor. Further, the electric motor is an external rotor brushless motor. The electric motor includes a rotor assembly 411b and a stator assembly 411c, the rotor assembly 411b includes a rotor shaft, the rotor shaft is the motor shaft 411a, and the rotor assembly 411b further includes a rotor sleeve 411d surrounding the rotor shaft. The stator assembly 411c includes a stator core 411e, the stator coil and the stator bracket 411f, the stator coil is wound around the stator core 411e, and stator bracket 411f is use to support the stator core 411e, the rotor shaft, and the like. Wherein, the diameter of the rotor sleeve 411d is D mm. Further, for a person skilled in the art, in general, for the external rotor brushless motor, the diameter of the electric motor is also referred to as the diameter D of the rotor sleeve 411d. That is to say, when considering the diameter of the electric motor, the size of the stator bracket 411f in the radial direction is generally not considered, and only the radial dimension of the rotor sleeve 411d is considered. That is to say, the diameter of the rotor sleeve 411d is Dmm. A weight of the front end assembly 40b is W1g, and further, a weight of the driving device 41, the trimmer head 30, and a portion connected to the driving device 41 or the trimmer head 30 is W1g, that is, a portion located at the front end 431b of the connecting rod 431 is W1g. Wherein a ratio of the diameter D of the rotor sleeve 411d to the weight W1 of the front end assembly 40b is greater than or equal to 0.01 and less than or equal to 0.3. Thus, the size of the electric motor can be made smaller and the weight of the front end assembly 40b is lighter, so that on the one hand, it is more advantageous for the front end 431b of the grass trimmer 300 to be smaller, and on the other hand, the user can operate the grass trimmer 300 more easily, and the cutting efficiency is improved. Further, the diameter D of the rotor sleeve 411d is greater than or equal to 15 and less than or equal to 48, and the weight W1 of the front end assembly 40b is greater than or equal to 850 and less than or equal to 1050, thereby further making the diameter of the electric motor relatively small. Further, the diameter D of the rotor sleeve 411d is greater than or equal to 30 and less than or equal to 40, for example, the diameter D of the rotor sleeve 411d is 35, and the weight W1 of the front end assembly 40b is greater than or equal to 900 and less than or equal to 1050, thereby further making the diameter of the motor relatively small. In the present example, the grass trimmer 300 may also include a reduction assembly for transmitting a power between the rotor shaft and the trimmer head 30 as shown in the first example. The reduction assembly has a reduction ratio R, specifically the reduction ratio is a ratio of the rotational speed of the rotor shaft to the rotational speed of the trimmer head 30. Thus, a ratio of the diameter D of the rotor sleeve 411d to the reduction ratio R of the reduction assembly is greater than or equal to 1 and less than or equal to 20, so that it is possible to make the size of the electric motor small while the output rotational speed of the grass trimmer 300 meets the requirements. In the present example, a weight of the electric motor is W2g, and a ratio of the weight W2 of the electric motor to the weight W1 of the front end assembly 40b is greater than or equal to 0.05 and less than or equal to 1, and further, the ratio of the weight W2 of the electric motor to the weight W1 of the front end assembly 40b is greater than or equal to 0.1 and less than or equal to 0.6, so that the weight of the electric motor is relatively small with respect to the weight of the front end assembly 40b. In the present example, a second airflow member 411g is fixedly connected to the rotor shaft, and the second airflow member 411g is disposed in the first housing 412. Thus, the second airflow member 411g can generate an airflow to the first airflow members when the electric motor rotates, and the first airflow members cause the airflow to blow away from the trimmer head 30, thereby improving the heat dissipation effect.

Understandably, in the present example, the trimmer head 30 may also be provided with a limiting device for limiting the rotation of the head housing 31. The limiting device may specifically be a one-way bearing, and more specifically, the axial stop member 37 is the one-way bearing. Thus, when the trimmer head 30 is mounted to another grassing machine which can drive the motor 411 to rotate in a reverse direction, the trimmer head 30 can also realize an auto-winding mode.

Figure 29:
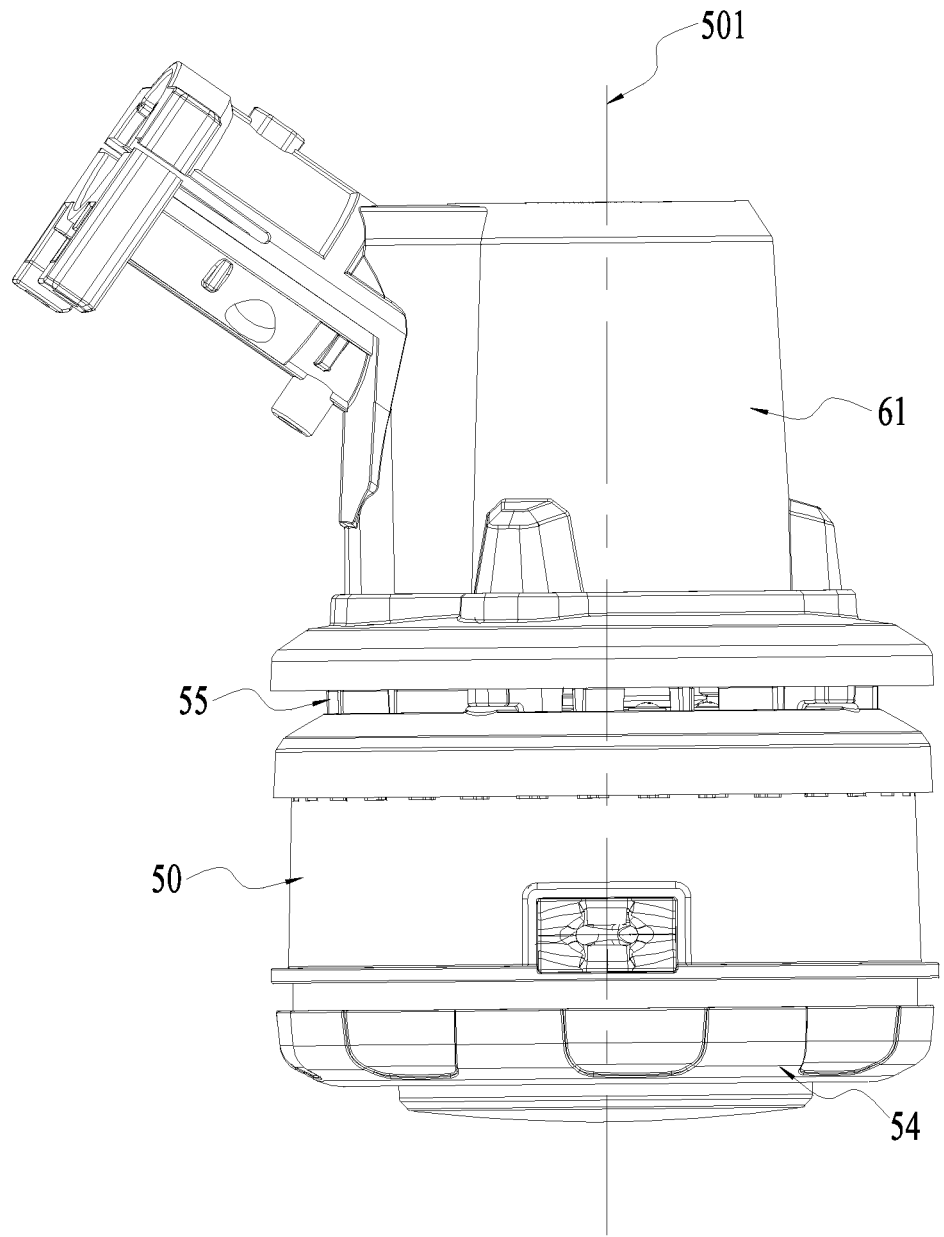
FIG. 29 is a plan view of a driving device and a trimmer head in a grass trimmer according to a third example of the present invention.
Figure 30:
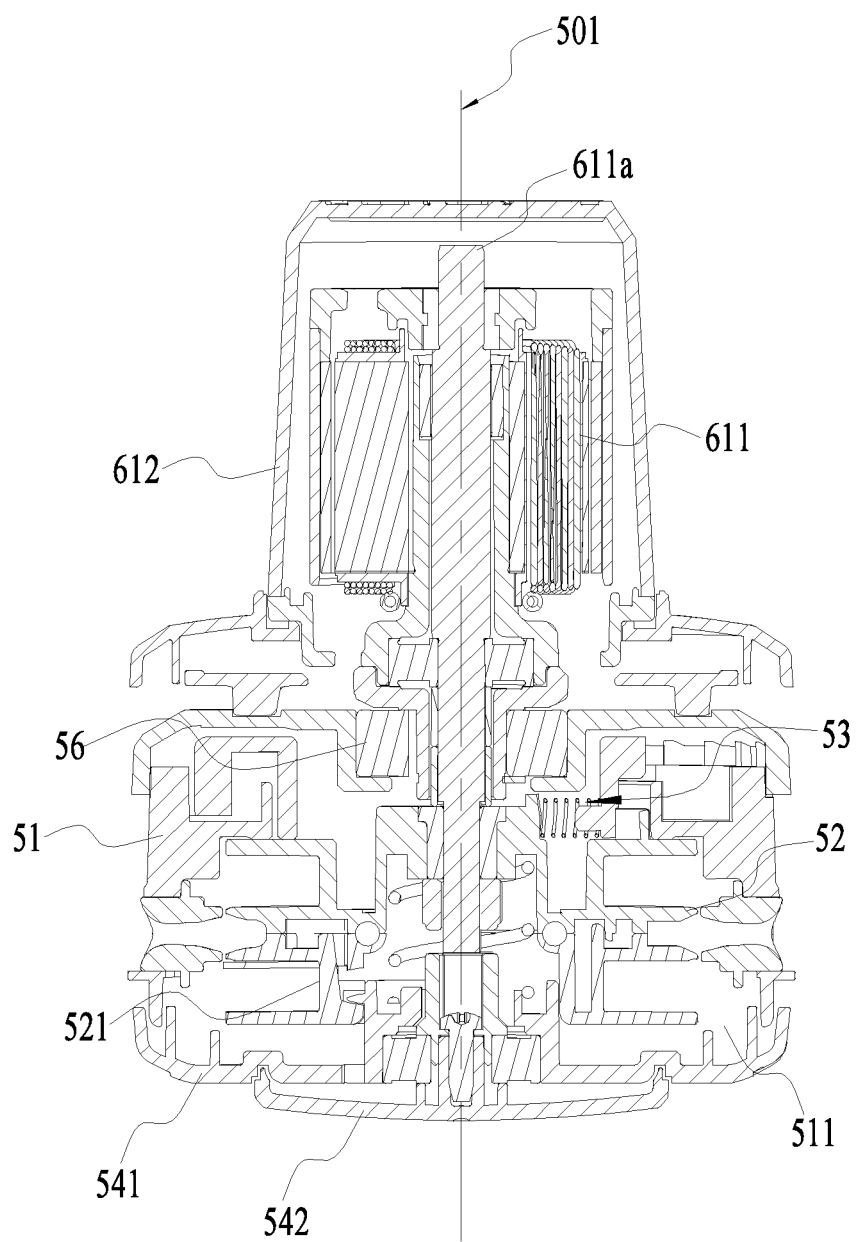
FIG. 30 is a sectional view of the structure in FIG. 29.
Figure 31:
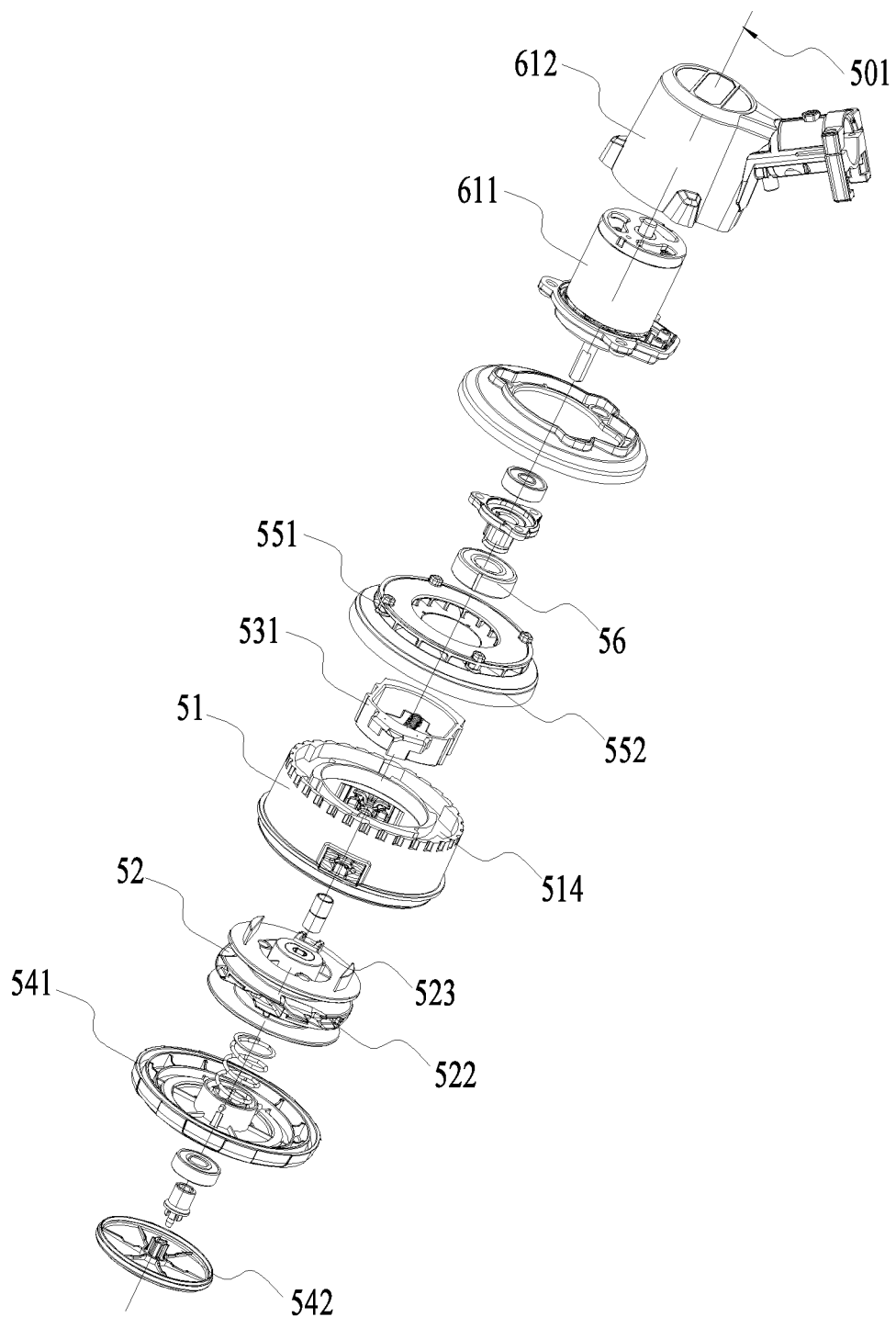
FIG. 31 is an exploded view of the structure in FIG. 29.
Figure 32:
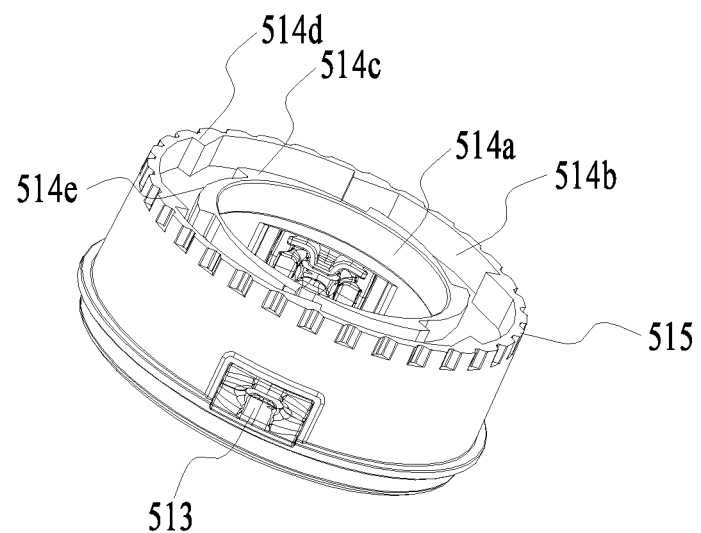
FIG. 32 is a three-dimensional view of a head housing in FIG. 31.
Figure 33:
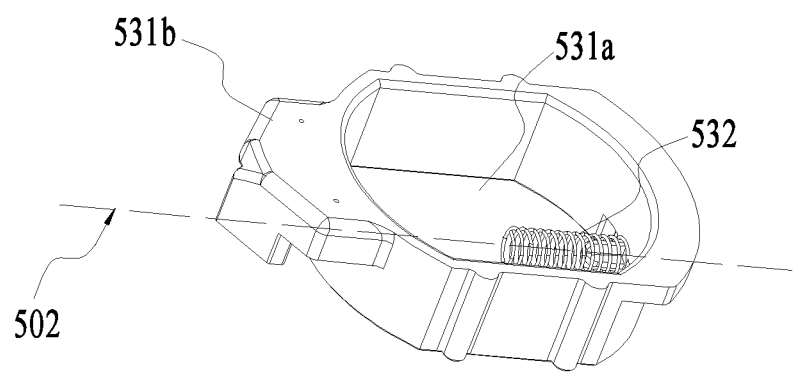
FIG. 33 is a three-dimensional view of a slider in FIG. 31.

FIG. 29 shows the structure of a trimmer head 50 and a driving device 61 of a grass trimmer in a third example. In the present example, the grass trimmer has the same driving device 61, operating device and connecting device as in the second example. The difference is only that the specific structure of the trimmer head 50 is different. The difference between the present example and the second example will be mainly described.

As shown in FIGS. 29-33, in the present example, the trimmer head 50 includes a head housing 51, a spool 52, a line feeding device 53, a lower cover assembly 54, and a fan assembly 55.

The head housing 51 surrounds a rotation axis 501 to form an accommodating space 511 for accommodating at least a portion of the spool 52. The side where the head housing 51 forms the accommodating space 511 is an inner side of the head housing 51, and the other side of the head housing 51 opposed to the inner side is an outer side. The lower cover assembly 54 is disposed on a lower side of the head housing 51, and the lower cover assembly 54 at least partially closes an opening of the accommodating space 511 that is open downward.

The spool 52 is provided in the accommodating space 511, that is, the spool 52 is provided on the inner side of the head housing 51. The spool 52 forms winding portions 521 for winding a trimmer line. The head housing 51 is further formed with outer holes 513 for the trimmer line to extend to the outer side of the head housing 51. The number of outer holes 513 is 2. A portion of the trimmer line that extends beyond the head housing 51 through the outer holes 513 is defined as an effective portion of the trimmer line, which cuts off weeds by high-speed rotation. In order to mow weeds within a certain range, the length of the effective portion of the trimmer line can reach a preset value, that is to say, the length of the trimmer line must be greater than or equal to the preset value. The spool 52 is further formed with inner holes 522. When the inner holes 522 and the outer holes 513 are located in the same radial direction, the trimmer line can pass through the outer holes 513 and the inner holes 522 in turn.

The line feeding device 53 controls whether or not the trimmer head 50 is feeding the trimmer line. The line feeding device 53 has a first working mode that prevents the trimmer head 50 from feeding the trimmer line, and the trimmer head 50 is in a cutting mode. The line feeding device 53 has a second working mode that allows the trimmer head 50 to feed the trimmer line, and the trimmer head 50 is in a line feeding mode. When the line feeding device 53 is in the first working mode, the spool 52 and the head housing 51 are relatively stationary, so that the spool 52 and the head housing 51 will be driven by a motor shaft 611a to rotate synchronously so that the length of the effective portion out of the head housing 51 of the trimmer line wound around the spool 52 does not change, that is, the trimmer line cannot be released, and the trimmer head 50 is in a normal working state. When the line feeding device 53 is in the second working mode, a relative movement is generated between the spool 52 and the head housing 51, so that the trimmer line drives the spool 52 to rotate with respect to the head housing 51 under the action of a centrifugal force, so that the trimmer line is released, and the length of the effective portion of the trimmer line will be increased.

A main switch is movably connected with a handle, and the main switch has at least a first position and a second position when the main switch is movable with respect to the handle. When a user triggers the main switch to move to the first position, the line feeding device 53 is in the first working mode, and the trimmer head 50 is in the normal cutting mode at this time. When the user triggers the main switch to move to the second position, the line feeding device 53 is in the second working mode, the trimmer head 50 is in the line feeding mode at this time, and the length of the effective portion of the trimmer line can be increased at this time. In this manner, when the user observes or detects that the length of the effective portion of the trimmer line is insufficient, the user may increase the length of the effective portion of the trimmer line by triggering the main switch. In the present example, whether or not the trimmer head 50 is feeding the trimmer line is controlled by active positions of the main switch, and it will be appreciated that in other examples, whether or not the trimmer head 50 is feeding the trimmer line may also be controlled according to the number of times the main switch is triggered.

The line feeding device 53 includes an intermediate element for transmitting torque. In the present example, the intermediate element is a slider 531. When the line feeding device 53 is in the first working mode, the slider 531 rotates synchronously with the spool 52, while the slider 531 also cooperates with the head housing 51 to drive the head housing 51 to rotate with the spool 52. When the line feeding device 53 is in the second working mode, the slider 531 rotates with the spool 52 while the slider 531 is disengaged from the engagement with the head housing 51, so that the spool 52 can rotate with respect to the head housing 51.

Specifically, the slider 531 is located between the spool 52 and the head housing 51. The motor shaft 611a rotates synchronously with the spool 52. The slider 531 is formed with a transmission hole 531a. Through the transmission hole 531a, the slider 531 is mounted on the spool 52, and the slider 531 can respond to the rotation of the spool 52 and rotate synchronously with the line shaft 52. The mass distribution of the slider 531 is asymmetrical with respect to the rotation axis 501, and further, the center of gravity of the slider 531 is offset from the rotation axis 501. A biasing element 532 is further disposed between the slider 531 and the spool 52, and the biasing element 532 is specifically a coil spring. Specifically, the spool 52 extends to form a receiving groove 523, and the coil spring is at least partially arranged in the receiving groove 523. One end of the coil spring abuts against a bottom surface of receiving groove 523 and the other end abuts against the slider 531. The center of gravity of the slider 531 and the coil spring are arranged on opposite sides of the rotation axis 501. The slider 531 is also slidably connected to the spool 52. When the slider 531 rotates with the spool 52, a centrifugal force will be generated, the slider 531 is also subjected to a biasing force of the biasing element 532 at the same time, the direction of the biasing force is opposite to the eccentric force, the directions of the centrifugal force and the biasing force can be further in the direction of a first straight line 502, and a direction in which the slider 531 slides with respect to the spool 52 may be along a first straight line 502. The coil spring is biased between the slider 531 and the spool 52. When a motor 611 runs at a first rotational speed n1 which can make the grass trimmer in a normal state of weeding, the biasing force of the biasing element 532 to the slider 531 is greater than or equal to the centrifugal force generated by the slider 531 when the slider 531 rotates, or the biasing force of the biasing element 532 to the slider 531 may be substantially balanced with the centrifugal force generated by the slider 531. Thus, the slider 531 is stationary relative to the spool 52 at this time. When the motor 611 accelerates from the first rotational speed n1, the biasing force of the biasing element 532 to the slider 531 will not be enough to balance with the centrifugal force generated by the slider 531. Under the action of the centrifugal force, the slider 531 will slide along the first straight line 502 relative to the spool 52.

In the present example, the head housing 51 surrounds the rotation axis 501 to form the accommodating space 511, the spool 52 is at least partially located in the accommodating space 511 formed by the head housing 51, and the slider 531 is partially located in the accommodating space 511 and partially protrudes out of the accommodating space 511. Specifically, the head housing 51 is formed with an upper bottom 514 at one end thereof close to the motor 611 in the direction of the rotation axis 501. The upper bottom 514 does not enclose the accommodating space 511, and the accommodating space 511 is partially opened upwardly, so that the motor shaft 611a extends into the accommodating space 511 through the upper bottom 514, and the slider 531 partially extends out of the head housing 51. The upper bottom 514 extends toward the motor 611 to form an inner ring 514a and an outer ring 514b. The inner ring 514a and the outer ring 514b both surround the rotation axis 501. The inner ring 514a is formed with first teeth 514c, the first teeth 514c are outer teeth formed on the inner ring 514a and protruding toward the outer ring 514b, the outer ring 514b is formed with second teeth 514d, and the second teeth 514d are inner teeth formed on the outer ring 514b and protruding toward the inner ring 514a. A number of the first teeth 514c is plural, and a number of the second teeth 514d is also plural. In circumferential directions around the rotation axis 501, the first teeth 514c and the second teeth 514d are staggered from each other, that is, the first teeth 514c and the second teeth 514d are not disposed in a diametrical direction perpendicular to the rotation axis 501. The slider 531 is formed with an engaging portion 531b that can be engaged with the first teeth 514c or the second teeth 514d. The engaging portion 531b is further an engaging tooth, and the first teeth 514c and the second teeth 514d are receiving portions used for receiving the engaging tooth. In the present example, the engaging tooth and the biasing element 532 are respectively disposed on opposite sides of the rotation axis 501, that is, the engaging tooth and the center of gravity of the slider 531 are disposed on the same side of the rotation axis 501. When the engaging tooth of the slider 531 engages with the first teeth 514c or the second teeth 514d and the motor shaft 611a rotates, the slider 531 causes the head housing 51 to be stationary with respect to the spool 52, that is, there is no relative movement between the spool 52 and the head housing 51 at this time, it is assumed that the line feeding device 53 is in the first working mode, the grass trimmer is in the cutting mode that can normally trimming grass, and the trimming hear 50 is rotated in a second rotation direction at this time. When the engaging tooth of the slider 531 is disengaged from both the first teeth 514c and the second teeth 514d, a whole of the slider 531 and the spool 52 is movable relative to the head housing 51. In the present example, the direction in which the spool 52 moves relative to the head housing 51 coincides with the direction in which the grass trimmer trims grass. Further, the direction in which the spool 52 moves relative to the head housing 51 is the second rotation direction at this time, that is to say, the spool 52 can move relative to the head housing 51 at this time. It can be considered that the line feeding device 53 is in the second working mode, that is, the trimmer head 50 is in the line feeding mode. At this time, under the action of the centrifugal force, the trimmer line can make the spool 52 rotate relative to the head housing 51, thus the length of the effective portion out of the head housing 51 of the trimmer line can be increased.

When the motor 611 drives the spool 52 to rotate at a first rotational speed n1 such that the grass trimmer is in the cutting mode, the slider 531 makes the engaging tooth engage with the first teeth 514c of the inner ring 514a under the biasing force of the biasing element 532, so that the line feeding device 53 is in the first working mode, the head housing 51 is stationary relative to the spool 52, and the length of the effective portion out of the head housing 51 of the trimmer line is fixed. When the motor 611 accelerates from the first speed n1, the centrifugal force generated by the slider 531 will overcome the biasing force of the biasing element 532, the slider 531 slides along the first straight line 502 with respect to the spool 52, and the engaging tooth is disengaged from the outer teeth of the inner ring 514a. At this time, the head housing 51 will not be driven by the slider 531 to make the line feeding device 53 in the second working mode. At this time, the spool 52 can rotate relative to the head housing 51, and then, under the action of the centrifugal force, the length of the effective portion of the trimmer line is increased to achieve the purpose of feeding the trimmer line.

In the present example, the fan assembly 55 specifically includes a fan 551 on which a fan blade is formed and a mounting member 552 for mounting the fan 551 to the trimmer head 50 or the driving device 61. In the present example, the grass trimmer further includes a limiting device 56 for limiting rotation of the fan assembly 55 about the rotation axis 501. In the present example, the limiting device 56 is specifically a one-way bearing. Specifically, the grass trimmer further includes a supporting element for supporting the one-way bearing, and the supporting element may be formed by a first housing 612 for accommodating the motor 611, or may be formed by other parts fixed relative to the first housing 612. Thus, the fan assembly 55 can only rotate relative to the supporting element in one direction and not in the other, for example, in the present example, the fan assembly 55 can rotate relative to the supporting element in the second rotation direction about the rotation axis 501, and the fan assembly 55 cannot rotate relative to the supporting element in a first rotation direction.

In order to realize that when the trimmer head 50 rotates in the second rotation direction, the fan assembly 55 can also rotate together with the trimmer head 50, the head housing 51 is further formed with first transmission teeth 515, and the mounting member 552 is formed with second transmission teeth capable of engaging with the first transmission teeth 515. Thus, when the head housing 51 rotates with the spool 52 in the second rotation direction, the first transmission teeth 515 can drive the fan assembly 55 to rotate in the second rotation direction.

When the winding is required, the user controls the operating device to cause that the motor 611 drives the spool 52 to rotate in the first rotation direction, an arc-shaped surface 514e on the first teeth 514c of the head housing 51 allows the spool 52 to rotate in the first rotation direction at this time. As that the one-way bearing only allows the fan assembly 55 to rotate in the second rotation direction, the fan assembly 55 is now stationary relative to the first housing 612. Since the first transmission teeth 515 and the second transmission teeth cooperate to form a non-rotational connection between the head housing 51 and the fan assembly 55, the head housing 51 is also stationary with respect to the first housing 612, so that the spool 52 can rotate with respect to the head housing 51 in the first rotation direction under the drive of the motor shaft 611a, so that the trimmer line can be wound around the spool 52.

The lower cover assembly 54 includes a lower cover 541 and a contact member 542. The lower cover 541 rotates synchronously with the spool 52, and the lower cover 541 is further rotatable with respect to the head housing 51, so that the lower cover 541 can serve as an operating element for a user to rotate, and the operating element drives the spool 52 to rotate synchronously with the lower cover 541 and rotates with respect to the head housing 51. The contact member 542 is rotatably connected to the lower cover 541, and the contact member 542 can effectively reduce wear on the trimmer head 50 by the ground. In this way, in the present example, the user can also manually wind the trimmer line by holding the lower cover 541 with one hand and the head housing 51 or the fan assembly 55 with the other hand. Specifically, in the present example, when the user holds the fan assembly 55 or the head housing 51, or the first housing 612 in one hand, the other hand of the user rotates the lower cover 541 in the first rotation direction, then the low cover 541 drive the spool 52 and the motor shaft 611a to rotate in the first rotation direction. The fan assembly 55 is stationary with respect to the first housing 612 under the action of the one-way bearing, the head housing 51 is stationary with respect to the fan 551 under the action of the first transmission teeth 515 and the second transmission teeth, and the arc-shaped surface 514e of the outer teeth on the head housing 51 is capable of allowing the spool 52 to rotate in the first rotation direction, so that the spool 52 can rotate in the first rotation direction with respect to the head housing 51, and the trimmer line is wound onto the spool 52. In fact, it will be appreciated that in the present example, as long as the position of the grass trimmer is fixed, the user may only need one hand to rotate the lower cover 541 to make the spool 52 to rotate with respect to the head housing 51 in the first rotation direction so as to win the trimmer line to the spool 52, thereby avoiding the problem of winding the trimmer line to an arm.

Figure 34:
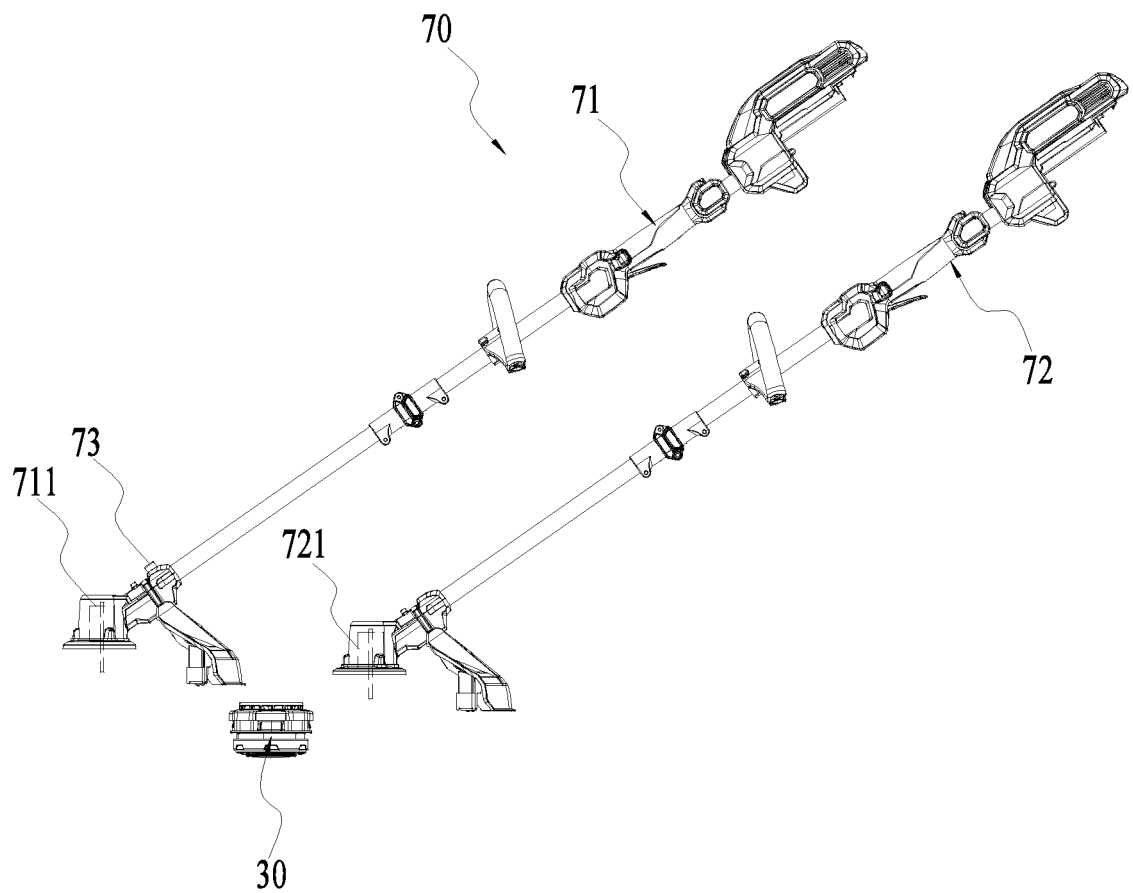
FIG. 34 is a structure view of a tool system for trimming grass.

The trimmer head in the first example or the second example may be adapted to different trimming main bodies to achieve different winding modes. Specifically, as shown in FIG. 34, the trimmer head 30 in the second example is applied to a tool system 70 as an example. Referring to FIG. 17 and FIGS. 34, a first trimming main body 71 includes a first motor 711, a second trimming main body 72 includes a second motor 721, and the trimmer head 30 is optionally mounted to the first trimming main body 71 or the second trimming main body 72, that is, the trimmer head 30 may be mounted to the different trimming main bodies. When the trimmer head 30 is mounted to the first trimming main body 71, the trimmer head 30 has the auto-winding mode and the manual winding mode. When the trimmer head 30 is in the auto-winding mode, the first motor 711 drives the spool 32 to rotate, the limiting device in the trimmer head 30 limits the rotation of the head housing 31, the spool 32 rotates with respect to the head housing 31 in the first rotation direction, and the trimmer line is automatically wound to the spool 32. When the trimmer head 30 is in the manual winding mode, the user operates the operating element 33, the operating element 33 drives the spool 32 to rotate, and the trimmer line is manually wound to the spool 32. When the trimmer head 30 is mounted to the second trimming main body 72, the trimmer head 30 has only a manual winding mode, and when the trimmer head 30 is in the manual winding mode, the user operates the operating element 33, the operating element 33 drives the spool 32 to rotate so that the trimmer line is wound onto the spool 32. Further, in order to realize the auto-winding mode when the trimmer head 30 is installed to the first trimming main body 71, in the present example, an activation switch 73 for activating the auto-winding mode should also be provided on the first trimming main body 71, and the activation switch 73 is connected to a control circuit. When the activation switch 73 is activated by the user, the control circuit controls the motor 411 to rotate in a reverse direction.

The above shows and describes basic principles, main features and advantages of the examples presented herein. For example, the present disclosure provides a trimmer head and a grass trimmer, which can avoid the problem of the trimmer line jamming. Those skilled in the art will appreciate that the examples presented herein do not limit the claimed invention in any way. Thus, technical solutions obtained by equivalent substitution or equivalent transformation fall within the scope of the claimed invention.

What is claimed is:

1. A trimmer head, comprising:
a head housing defining an accommodating space within the head housing;
a spool disposed in the accommodating space of the head housing and rotatable about a rotation axis, the spool comprising a winding portion for winding a trimmer line;
an intermediate element at least partially disposed in the accommodating space of the head housing and located adjacent the spool radially between the spool and the head housing, the intermediate element slidably coupled to the spool and slidable in a direction along the rotation axis;
an operating element fixedly coupled to the intermediate element, the operating element further comprising an operating portion comprising an outer wall, the outer wall located radially outside at least a portion of a side surface of the head housing and at least partially below a bottom surface of the head housing and the outer wall is rotatable by a user to drive the intermediate element to rotate; and
a spring extending between the spool and the operating element to bias the operating element and the intermediate element away from the spool,
wherein when the operating element and the intermediate element are biased away from the spool, the spool is coupled to the intermediate element to drive the intermediate element to rotate about the rotation axis and the intermediate element is coupled to the head housing to transmit a torque between the spool and the head housing such that the spool and the head housing rotate together about the rotation axis.

2. The trimmer head according to claim 1, wherein the intermediate element comprises a driving position and a non-driving position, wherein the intermediate element is biased away from the spool in the driving position and wherein the intermediate element is slid relative to the spool along the rotation axis towards the spool in the non-driving position, the intermediate element drives the head housing to rotate with the spool about the rotation axis when the intermediate element is in the driving position, and the intermediate element stops driving the head housing when the intermediate element is in the non-driving position.

3. The trimmer head according to claim 1, wherein the intermediate element is formed with a plurality of driving teeth arranged sequentially in a circumferential direction around the rotation axis, and the head housing is formed with matching teeth operably coupleable to the plurality of driving teeth.

4. The trimmer head according to claim 3, wherein the bottom surface of the head housing is at least partially extending in a plane perpendicular to the rotation axis, the matching teeth are located on a first side of the bottom surface, and the bottom surface is also formed with limiting teeth for limiting an angle at which the spool rotates with respect to the head housing in a first direction about the rotation axis, and the limiting teeth are formed on a second side of the bottom surface opposite the first side.

5. The trimmer head according to claim 3, wherein the intermediate element comprises an annular portion surrounding around the rotation axis and the driving teeth extend from the annular portion in a radial direction away from the rotation axis.

6. The trimmer head according to claim 5, wherein each of the matching teeth is formed with a driving surface for receiving a driving force of the driving teeth so that the head housing rotates synchronously with the spool in a first direction, and each of the matching teeth is formed with an inclined surface allowing the spool to rotate with respect to the head housing in a second rotation direction about the rotation axis opposite the first direction.

7. The trimmer head according to claim 6, wherein the intermediate element and the operating element are two independently formed parts, the intermediate element and the operating element are fixedly connected by fasteners, the bottom surface of the head housing is at least partially extending in a plane perpendicular to the rotation axis, the driving teeth are located on a first side of the bottom surface, and the operating portion is located on a second side of the bottom surface opposite the first side, the first side of the bottom surface being closer to the spool than the second side of the bottom surface.

8. The trimmer head of claim 1, wherein the head housing defines a through hole in the bottom surface to accommodate the intermediate element, and a radial width of the operating portion located below the bottom surface of the head housing is larger than a radial width of the through hole.

9. The trimmer head of claim 1, wherein a width of the operating portion located below the bottom surface of the head housing is larger than a width of the bottom surface of the head housing.

10. A trimmer head, comprising:
- a head housing comprising a first housing portion mountable adjacent a motor and rotatable about a rotation axis and a second housing portion detachably coupleable to the first housing portion, together the first housing portion and the second housing portion defining an accommodating space within the head housing;
- a spool disposed in the accommodating space of the head housing and capable of rotating about the rotation axis, the spool comprising a winding portion for winding a trimmer line;
- an intermediate element at least partially disposed in the accommodating space of the head housing and located radially between the spool and the head housing, the intermediate element configured to be slidably coupled to the spool and slidable in a direction along the rotation axis;
- an operating element disposed outside the accommodating space of the head housing and fixedly coupled to the intermediate element with the second housing portion located between the operating element and the intermediate element, the operating element further comprising an operating portion comprising an outer wall, the outer wall located radially outside at least a portion of a side surface of the head housing and at least partially below a bottom surface of the head housing and the outer wall used by a user to drive the intermediate element to rotate;
- a spring between the spool and the operating element to bias the operating element and the intermediate element away from the spool,
- wherein when the operating element and the intermediate element are biased away from the spool, the spool drives the intermediate element to rotate about the rotation axis and the intermediate element transmits a torque between the spool and the head housing such that the spool and the head housing rotate together about the rotation axis.

* * * * *